(12) United States Patent
Yan et al.

(10) Patent No.: US 12,353,654 B2
(45) Date of Patent: Jul. 8, 2025

(54) TOUCH DISPLAY PANEL AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Zhenglong Yan, Beijing (CN); Yanyang Shang, Beijing (CN); Hui Lu, Beijing (CN); Ling Shi, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/027,495

(22) PCT Filed: May 26, 2022

(86) PCT No.: PCT/CN2022/095313
§ 371 (c)(1),
(2) Date: Mar. 21, 2023

(87) PCT Pub. No.: WO2023/225956
PCT Pub. Date: Nov. 30, 2023

(65) Prior Publication Data
US 2024/0295932 A1   Sep. 5, 2024

(51) Int. Cl.
*G06F 3/041* (2006.01)
*G02F 1/1333* (2006.01)

(52) U.S. Cl.
CPC ............ *G06F 3/041* (2013.01); *G02F 1/1333* (2013.01)

(58) Field of Classification Search
None
See application file for complete search history.

(56) References Cited

U.S. PATENT DOCUMENTS

| | | | |
|---|---|---|---|
| 2017/0156206 A1 | 6/2017 | Kogawa et al. | |
| 2019/0056811 A1* | 2/2019 | Wang | G06F 3/041 |
| 2019/0129567 A1 | 5/2019 | Rhe et al. | |
| 2020/0019282 A1* | 1/2020 | Luo | G06F 3/04164 |
| 2021/0181888 A1 | 6/2021 | Yan et al. | |
| 2021/0333942 A1 | 10/2021 | Zhang | |

(Continued)

FOREIGN PATENT DOCUMENTS

| | | |
|---|---|---|
| CN | 103186276 A | 7/2013 |
| CN | 105808027 A | 7/2016 |

(Continued)

*Primary Examiner* — Duane N Taylor, Jr.
(74) *Attorney, Agent, or Firm* — ArentFox Schiff LLP; Michael Fainberg

(57) ABSTRACT

Embodiments of the disclosure provide a touch display panel and a display device. The touch display panel includes a base substrate, where the base substrate includes a display area, a bezel area surrounding the display area and a bonding area extending from the bezel area on one side; and a touch structural layer, on a side of the base substrate. The touch structural layer includes a plurality of touch traces in the bezel area; and at least part of the touch traces are single-layered traces and adjacent single-layered touch traces are disposed in different layers.

18 Claims, 32 Drawing Sheets

(56) References Cited

U.S. PATENT DOCUMENTS

| | | |
|---|---|---|
| 2021/0357094 A1 | 11/2021 | Qiao et al. |
| 2021/0365167 A1 | 11/2021 | You |
| 2022/0147216 A1 | 5/2022 | Huang et al. |
| 2022/0326830 A1* | 10/2022 | Zhang .................. G06F 3/0443 |

FOREIGN PATENT DOCUMENTS

| | | | | |
|---|---|---|---|---|
| CN | 107390941 A | * | 11/2017 | ......... G02F 1/13338 |
| CN | 108415601 A | | 8/2018 | |
| CN | 207799654 U | | 8/2018 | |
| CN | 109491546 A | | 3/2019 | |
| CN | 110515505 A | | 11/2019 | |
| CN | 111373356 A | | 7/2020 | |
| CN | 112612371 A | * | 4/2021 | ......... G06F 3/04164 |
| CN | 112965638 A | | 6/2021 | |

\* cited by examiner

TOUCH DISPLAY PANEL AND DISPLAY DEVICE

CROSS REFERENCE TO RELATED APPLICATIONS

This application is a national phase entry under 35 U.S.C. § 371 of International Application No. PCT/CN2022/095313, filed on May 26, 2022, the entire content of which is incorporated herein by reference.

FIELD

The disclosure relates to the field of semiconductor technology, in particular to a touch display panel and a display device.

BACKGROUND

With continuous development of the organic light emitting technology today, the screen bezel gets gradually narrower. However, implementation of narrow bezel still faces many challenges, such as packaging and modules, etc. Narrow bezel for flexible multi-layer on cell (FMLOC) technology is also a challenge.

SUMMARY

Embodiments of the disclosure provide a touch display panel and a display device. The touch display panel includes: a base substrate, including: a display area, a bezel area surrounding the display area and a bonding area extending from the bezel area on one side; and a touch structural layer on a side of the base substrate. The touch structural layer includes a plurality of touch traces in the bezel area; and at least part of the touch traces are single-layered traces and adjacent single-layered touch traces are disposed in different layers.

In one possible implementation, the bezel area includes a plurality of corner areas. The plurality of touch traces extend to the bonding area through at least one of the corner areas, in at least one of the corner areas, at least part of the touch traces are single-layered traces, and adjacent single-layered touch traces are disposed in different layers.

In one possible implementation, adjacent single-layered touch traces are disposed in two conducting layers, and the touch traces respectively arranged in two conducting layers are arranged alternately.

In one possible implementation, the touch display panel further includes a dam structure between the base substrate and the touch structural layer, and the dam structure includes a first dam structure in the bezel area connected with the bonding area and extending along a first direction. In at least one of the corner areas, the touch traces are at least distributed on a side of the first dam structure facing away from the bonding area.

In one possible implementation, in at least one of the corner areas, all the touch traces are distributed at a side of the first dam structure facing away from the bonding area.

In one possible implementation, in at least one of the corner areas, the touch traces include a first touch trace group arranged at a side of the first dam structure facing away from the bonding area, and a second touch trace group arranged at a side of the first dam structure close to the bonding area.

In one possible implementation, in the first touch trace group, the touch traces are single-layered traces, and adjacent single-layered touch traces are disposed in different layers.

In one possible implementation, in the second touch trace group, at least part of the touch traces are single-layered traces, and adjacent single-layered touch traces are disposed in different layers.

In one possible implementation, in the first touch trace group and the second touch trace group, the touch traces are single-layered traces, and adjacent single-layered touch traces are disposed in different layers.

In one possible implementation, the touch traces include bridge trace parts correspondingly electrically connected to the respective touch traces in the second touch trace group, an orthographic projection of the bridge trace part on the base substrate has an overlapping area with an orthographic projection of the first dam structure on the base substrate, and an extending direction of the orthographic projection of the bridge trace part on the base substrate is intersected with the first direction; at least part of the bridge trace parts are single-layered traces, and adjacent single-layered bridge trace parts are disposed in different layers.

In one possible implementation, the first touch trace group and the second touch trace group both include a plurality of first trace parts extending along the first direction; a center spacing between the adjacent bridge trace parts in an arrangement direction is greater than a center spacing between the adjacent first trace parts in the arrangement direction.

In one possible implementation, the bezel area includes a first bezel area extending along the first direction and connected with the bonding area and a second bezel area; and the first dam structure is arranged in the first bezel area connected with the bonding area; and the touch trace includes second trace parts arranged in the second bezel area, and at least part of the second trace parts are double-layered traces.

In one possible implementation, a center spacing between the adjacent second trace parts in an arrangement direction is greater than a center spacing between the adjacent first trace parts in the arrangement direction.

In one possible implementation, the line width of the second trace part is substantially the same as the line width of the first trace part.

In one possible implementation, a gap distance of adjacent second trace parts is greater than a gap distance of adjacent first trace parts.

In one possible implementation, the line widths of all the first trace parts are the same.

In one possible implementation, a center spacing between the adjacent first trace parts of the same layer in the arrangement direction is twice a center spacing between the adjacent first trace parts of different layers in the arrangement direction.

In one possible implementation, the touch display panel further includes a plurality of touch electrodes arranged in the display area, and the touch electrodes are correspondingly electrically connected with the touch traces. The plurality of touch electrodes may include a plurality of driving units and a plurality of sensing units insulated from each other; the driving unit includes a plurality of driving electrodes arranged in line along the first direction, and a first connecting part electrically connecting two adjacent driving electrodes; and the sensing unit includes a plurality of sensing electrodes arranged in line along a direction vertical to the first direction, and a second connecting part electrically connecting two adjacent sensing electrodes.

In one possible implementation, the touch display panel includes a first metal layer, an insulating layer and a second metal layer which are stacked in sequence, wherein a plurality of via holes are arranged in the insulating layer. Among two conducting layers in which the touch traces are arranged, one layer of the touch traces is disposed in the first metal layer, and the other layer of the touch traces is disposed in the second metal layer.

Embodiments of the disclosure further provide a display device, wherein the touch display panel provided in embodiments of the disclosure is included.

DETAILED DESCRIPTION

Figure 1:
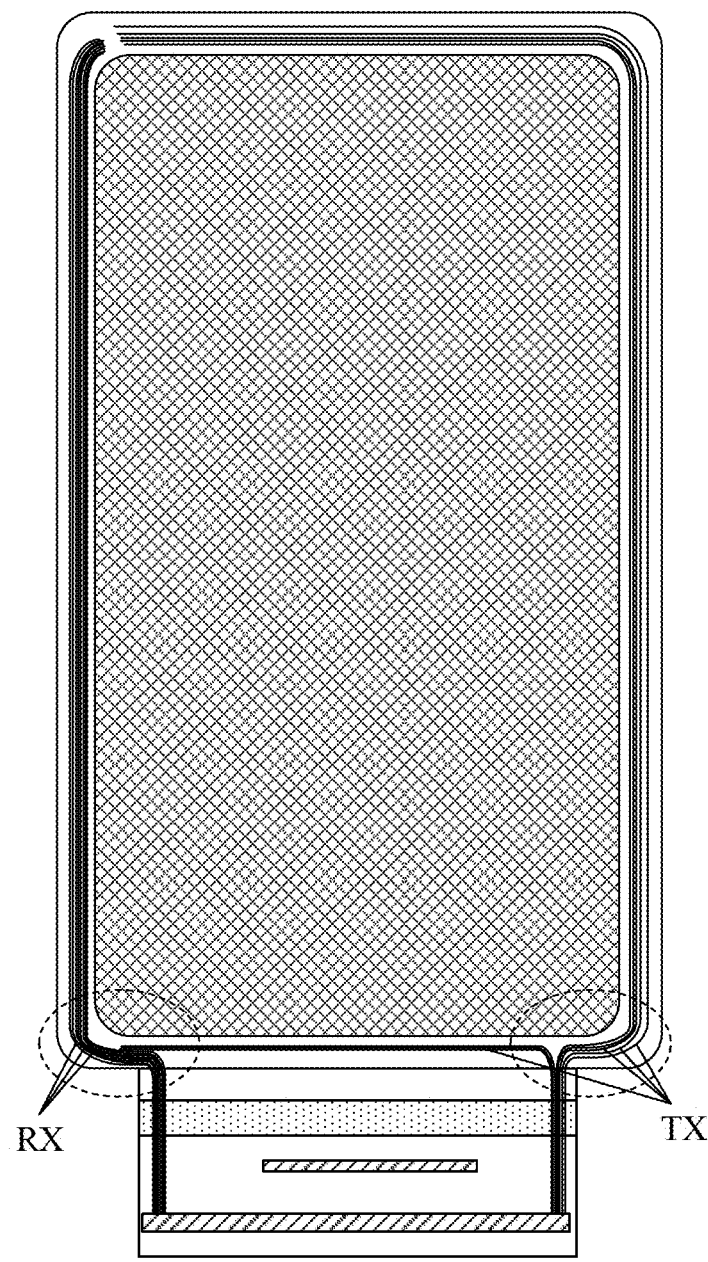
FIG. 1 is a schematic diagram of a top view of a touch display panel.

In order to make the object, technical solutions and advantages of the embodiments of the disclosure clearer, the technical solutions of the embodiments of the disclosure will be clearly and completely described below in combination with accompanying drawings in the embodiments of the disclosure. Apparently, the described embodiments are merely a part but not all of the embodiments of the disclosure. All the other embodiments obtained by those skilled in the art without any creative effort based on the described embodiments of the disclosure shall all fall within the protection scope of the disclosure.

Unless otherwise indicated, technical terms or scientific terms used in the disclosure should have general means understood by those skilled in the art to which the disclosure belongs. The words "first", "second" and the like used in the disclosure do not denote any order, quantity or importance, but are merely used to distinguish different components. Similar words such as "including" or "comprising" mean that the elements or objects appearing before the word cover the enumerated elements or objects appearing after the word and their equivalents without excluding other elements or objects. Similar terms such as "connected" or "connecting" are not limited to physical or mechanical connections but may include electrical connections, whether direct or indirect connections. "Upper", "lower", "left", "right" and the like are merely used to indicate a relative positional relationship. When the absolute position of the described object changes, the relative positional relationship may also change accordingly.

"Substantially" or "substantially identical" as used herein includes the indicated values and is meant to be within an acceptable deviation range for specific values as determined by those skilled in the art when taking into account the measurements in discussion and errors associated with measurements of specific quantities (i.e., limitations of the measurement system). For example, "substantially identical" may mean that the difference with respect to the indicated value is in the range of one or more standard deviations or in the range of ±30%, 20%, 10%, 5%.

In the accompanying drawings, the thickness of layers, films, panels and areas is enlarged. In the text, exemplary embodiments are described with reference to a cross-sectional diagram as a schematic diagram of an idealized embodiment. In this way, deviations from the shape of the figure as a result of, for example, manufacturing techniques and/or tolerances should be anticipated. Therefore, the embodiments described herein should not be construed as being limited to specific shapes of the area as shown in the text but to include deviations in shape caused by, for example, manufacturing. For example, an illustrated or described flat area may typically have rough and/or non-linear characteristics. In addition, illustrated sharp angles may be circular. Therefore, the areas shown in the figures may be schematic in nature and their shapes are not intended to illustrate the exact shapes of the areas, and are not intended to limit the scope of the claims.

Detailed description of known functions and known components is omitted in the disclosure in order to keep the following description of the embodiments of the disclosure clear and concise.

Ink jet print (IJP) in a packaging process usually prints a layer of organic material with a large thickness on a panel as an organic packaging layer, and the organic material will level out to a certain distance outside the display area. The traditional FMLOC process requires the surrounding touch traces to be above the inside of the dam by a certain distance, thereby ensuring that the metal traces of FMLOC are in a flat area of IJP printing, and products with general bezel can be designed according to this rule. However, for extremely narrow bezel products, such as products with bezels of 1 mm and 0.8 mm, traces are difficult to be completely ensured to be above the dam. Moreover, since the bezel is too narrow, the space of traces is very small, traces not only may cross over the dam, but also be not completely accommodated in a limited space of the bezel. When the bottom bezel is narrow, traces of the FMLOC (including a driving line TX and a sensing line RX) need to be taken up in left and right corners of the bottom bezel, and traces here are the densest, which is a big challenge to products. Specifically, the structure of the narrow-bezel product FMLOC is as shown in FIG. 1, where the dotted circle indicates the left and right corners in the bottom of the screen. For example, the lower left corner contains all the RX traces and part of the TX traces, and the traces here are the densest part of the whole screen, and the trace layout is greatly limited.

In view of this, embodiments of the disclosure provide a touch display panel, in combination with FIG. 2 to FIG. 6C, the touch display panel includes:
- a base substrate 1, including: a display area AA, bezel areas BB surrounding the display area AA and a bonding area CC extending from the bezel area BB on a side;
- a touch structural layer, on a side of the base substrate 1; where the touch structural layer includes a plurality of touch traces 2 in the bezel area BB; at least part of the touch traces 2 are single-layered traces and adjacent single-layered touch traces 2 are disposed in different layers.

In one possible implementation, the bezel area BB includes a plurality of corner areas Y; the plurality of touch traces 2 extend to the bonding area CC through at least one of the corner areas Y. In at least one of the corner areas Y, at least part of the touch traces 2 are single-layered traces, and adjacent single-layered touch traces 2 are disposed in different layers.

Specifically, for example. FIG. 3A to FIG. 3C each shows an enlarged view of the touch trace 2 in the second corner area Y2 from left on the left side of the bottom bezel in FIG. 2, where FIG. 3B shows a schematic diagram of one of the trace layers in FIG. 3A, FIG. 3C shows a schematic diagram of another trace layer in FIG. 3A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 3B; the second layer of touch traces 22 is disposed in the second metal layer, as shown in FIG. 3C; and the first layer of touch traces 21 and the second layer of touch traces 22 are disposed alternately.

Figure 2:
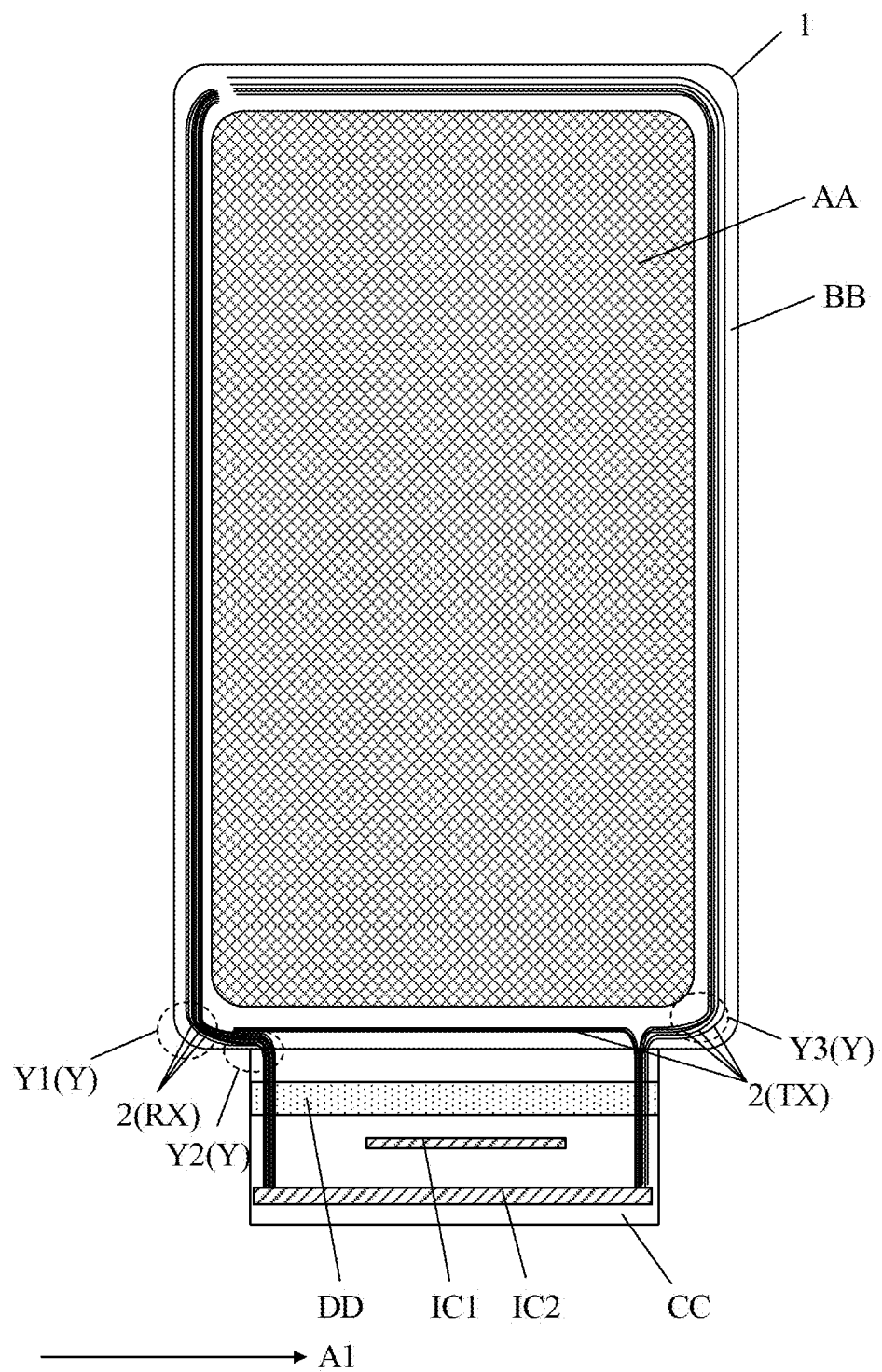
FIG. 2 is a first schematic diagram of a top view of a touch display panel according to an embodiment of the disclosure.
Figure 3A:
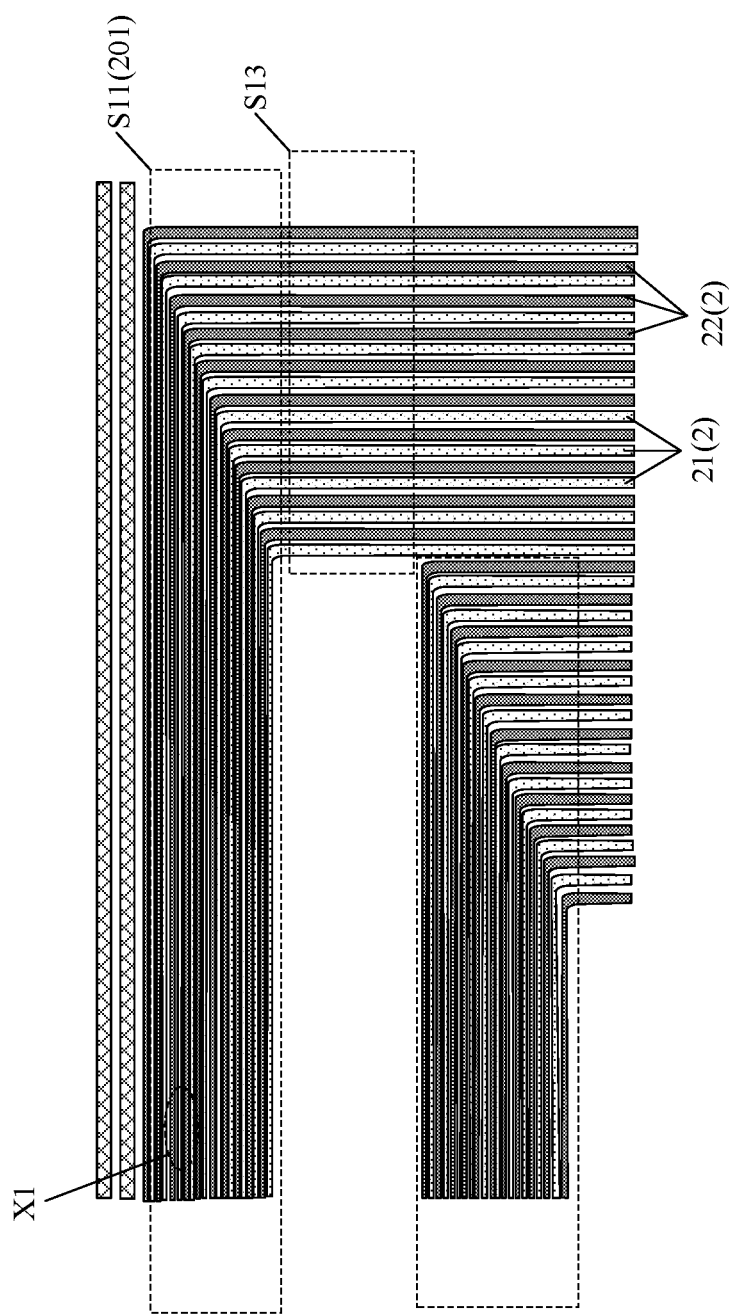
FIG. 3A is an enlarged view of the touch trace 2 in the second corner area Y2 from left on the left side of the bottom bezel in FIG. 2.
Figure 3B:
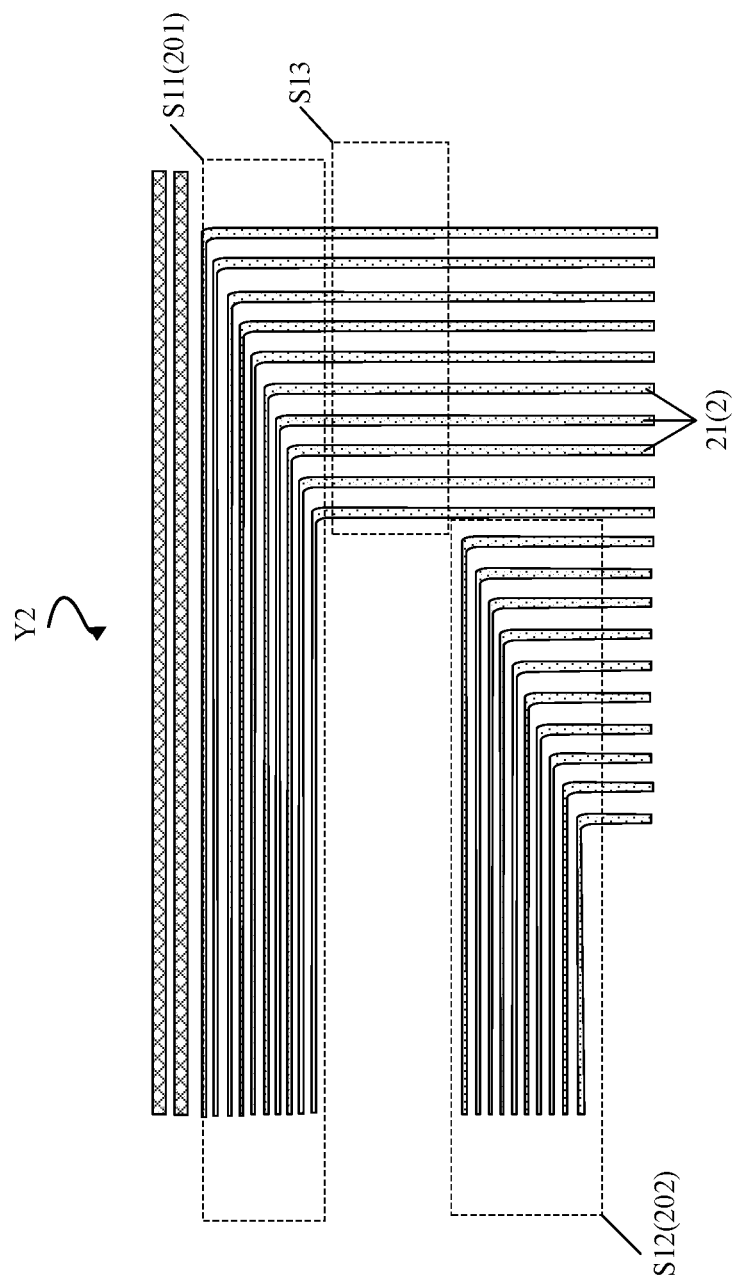
FIG. 3B shows a schematic diagram of one of the trace layers in FIG. 3A.
Figure 3C:
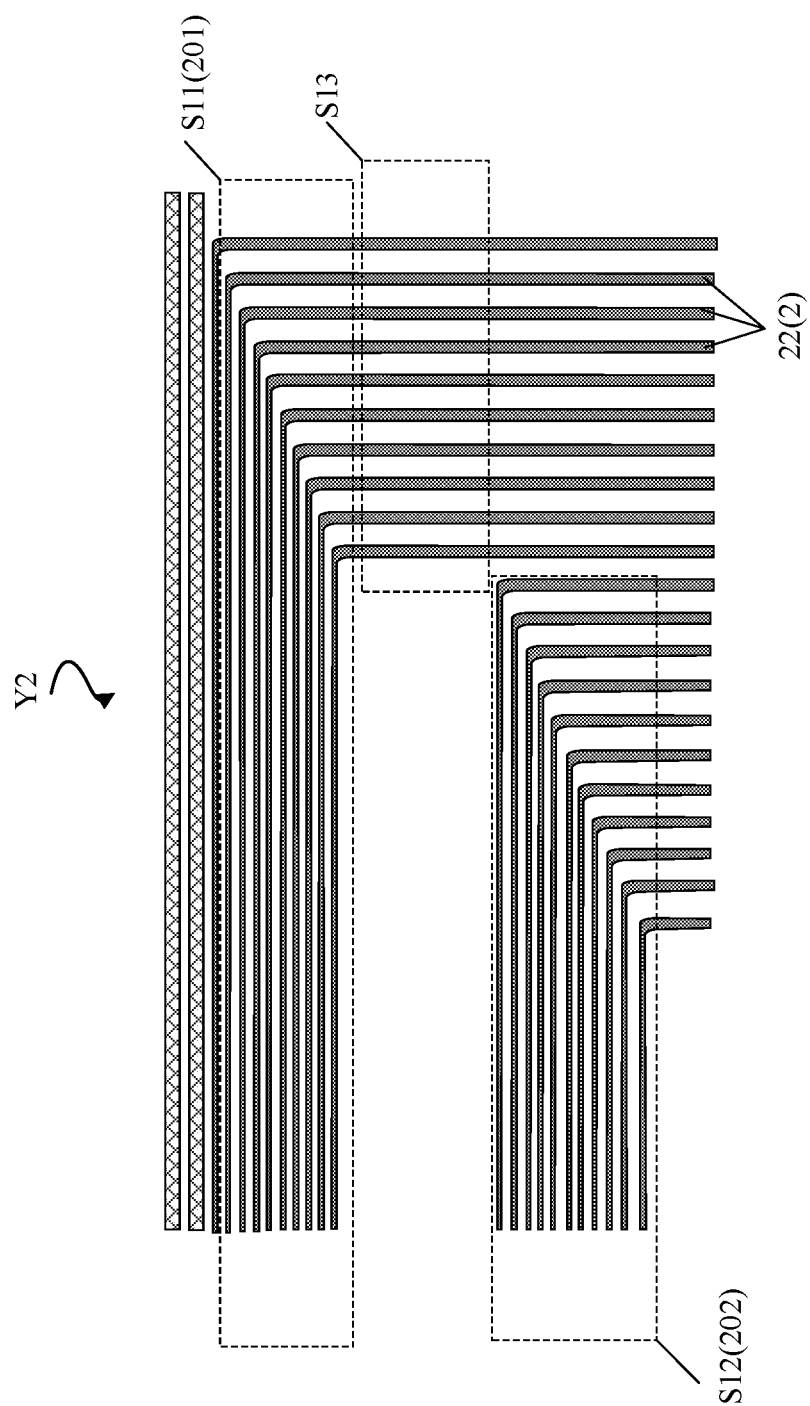
FIG. 3C shows a schematic diagram of another trace layer in FIG. 3A.
Figure 4A:
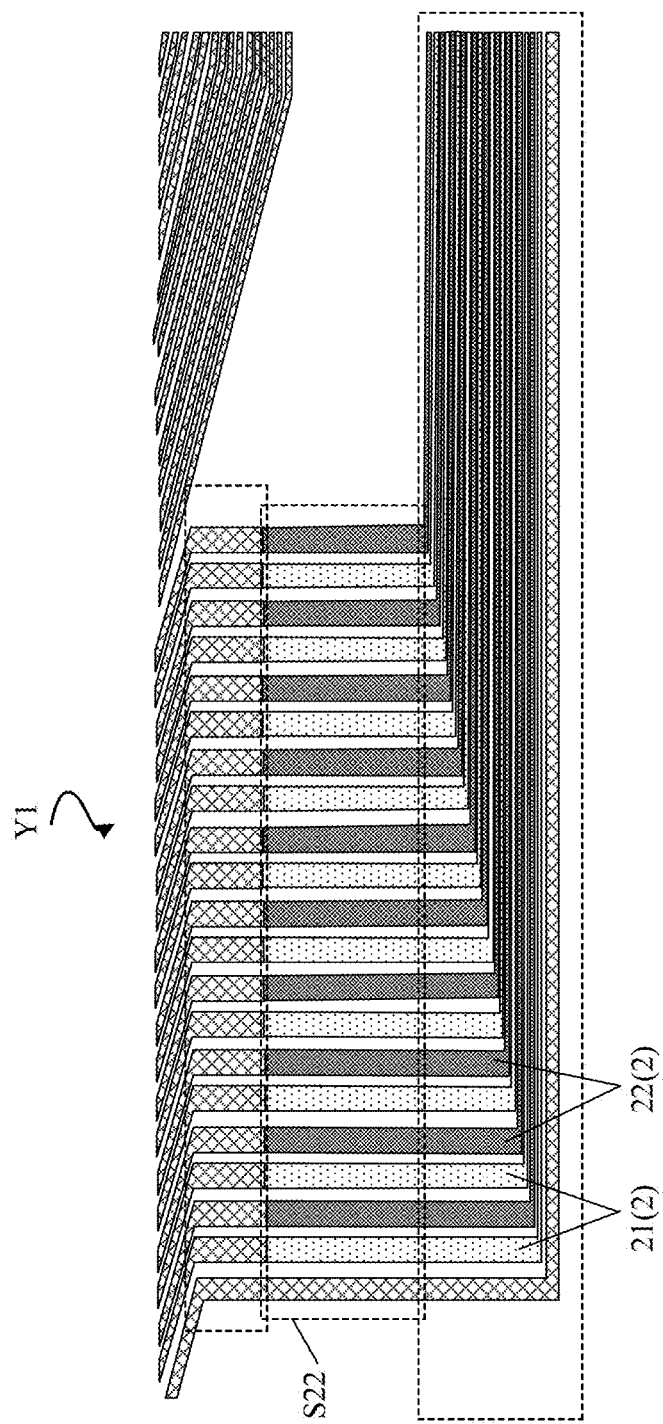
FIG. 4A is an enlarged view of the touch trace 2 in the first corner area Y1 from left on the left side of the bottom bezel in FIG. 2.
Figure 4B:
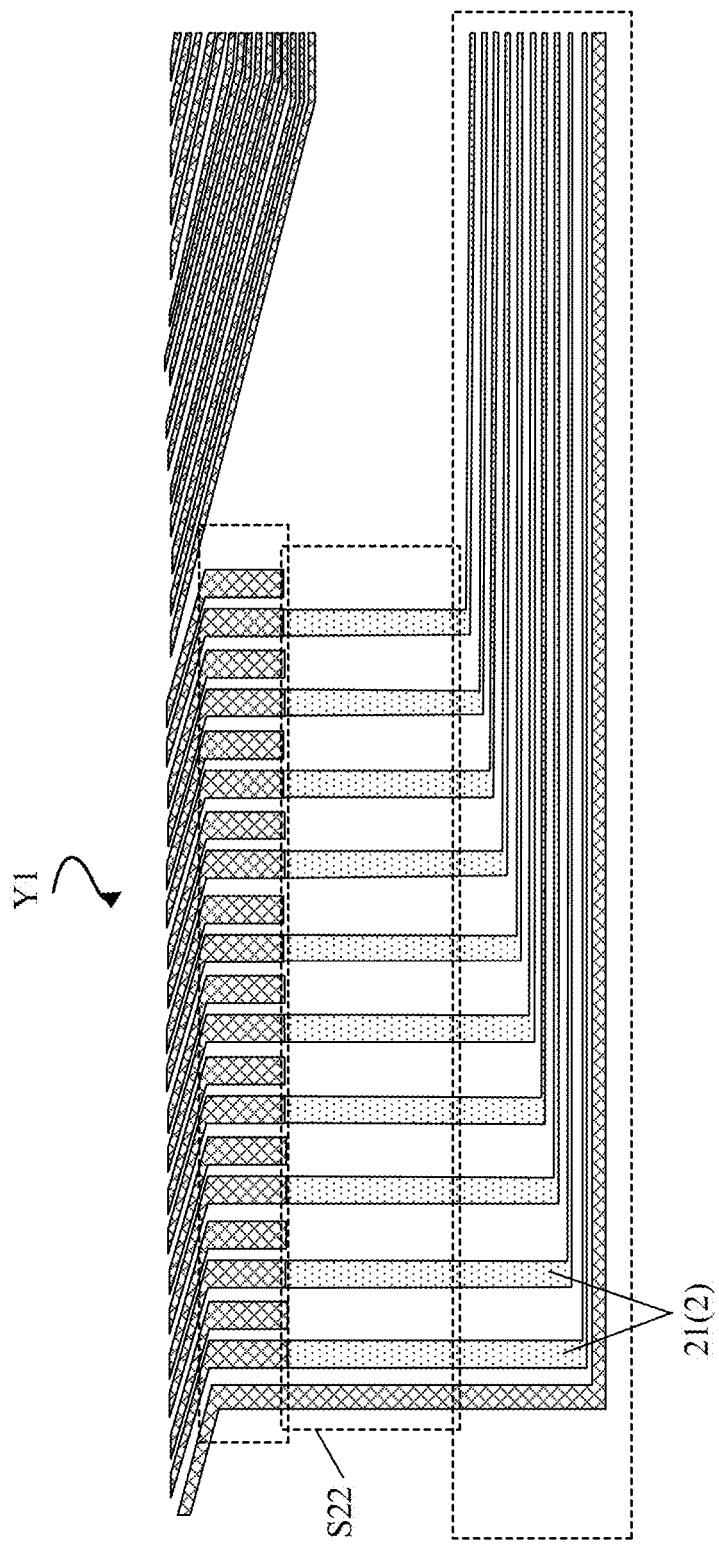
FIG. 4B shows a schematic diagram of one of the trace layers in FIG. 4A.
Figure 4C:
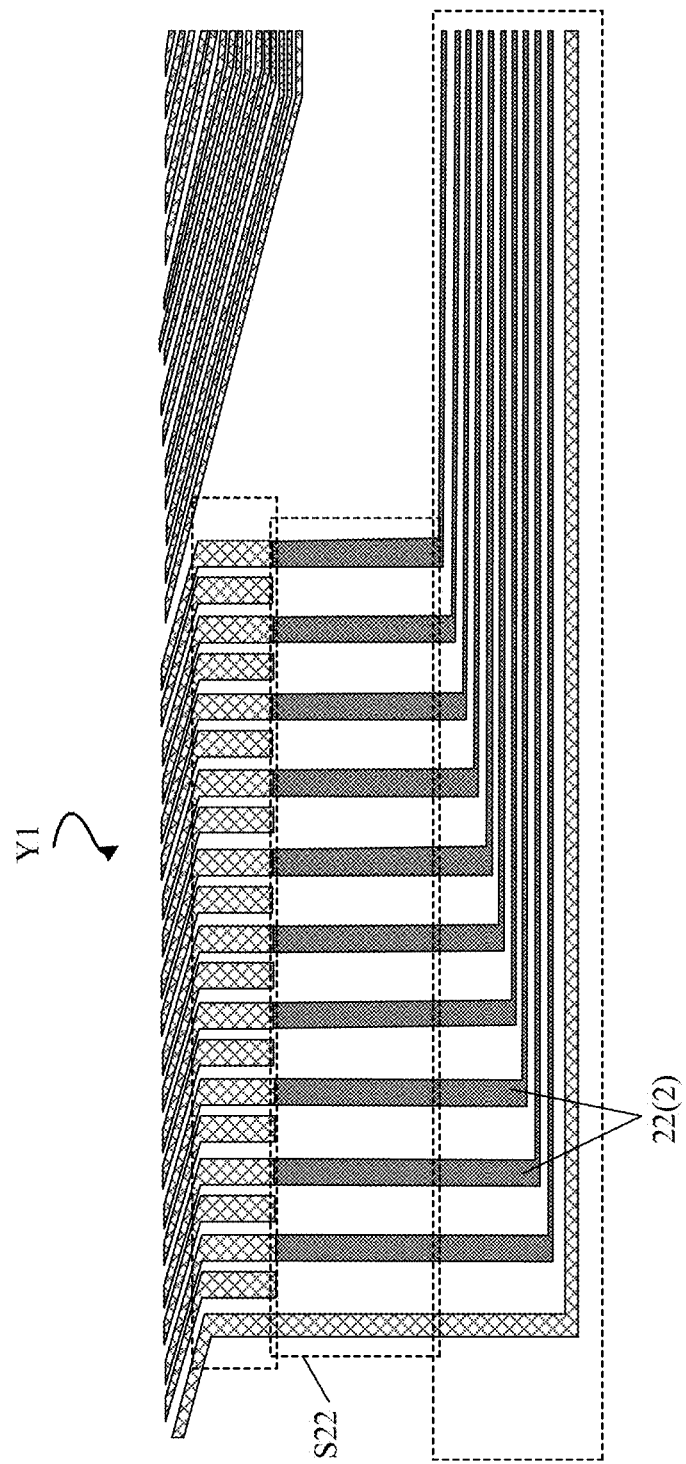
FIG. 4C shows a schematic diagram of another trace layer in FIG. 4A.

For another example, FIG. 4A to FIG. 4C each is an enlarged view of the touch trace 2 in the first corner area Y1 from left on the left side of the bottom bezel in FIG. 2, where FIG. 4B shows a schematic diagram of one of the trace layers in FIG. 4A, FIG. 4C shows a schematic diagram of another trace layer in FIG. 4A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 4B; the second layer of touch traces 22 is disposed in the second metal layer, as shown in FIG. 4C; and the first layer of touch traces 21 and the second layer of touch traces 22 are disposed alternately. Specifically, in combination with FIG. 4A to FIG. 4C, only part of the touch traces 2 in the lower part of the first corner area Y1 from left on the left side of the bottom bezel in FIG. 2 (for example, in combination with FIG. 9D to FIG. 9F, the touch traces 2 below the first dam structure 31) may be arranged to be single-layered traces, adjacent single-layered touch traces 2 are disposed in different layers, and touch traces 2 which are respectively disposed in two conducting layers are arranged alternately.

Figure 5A:
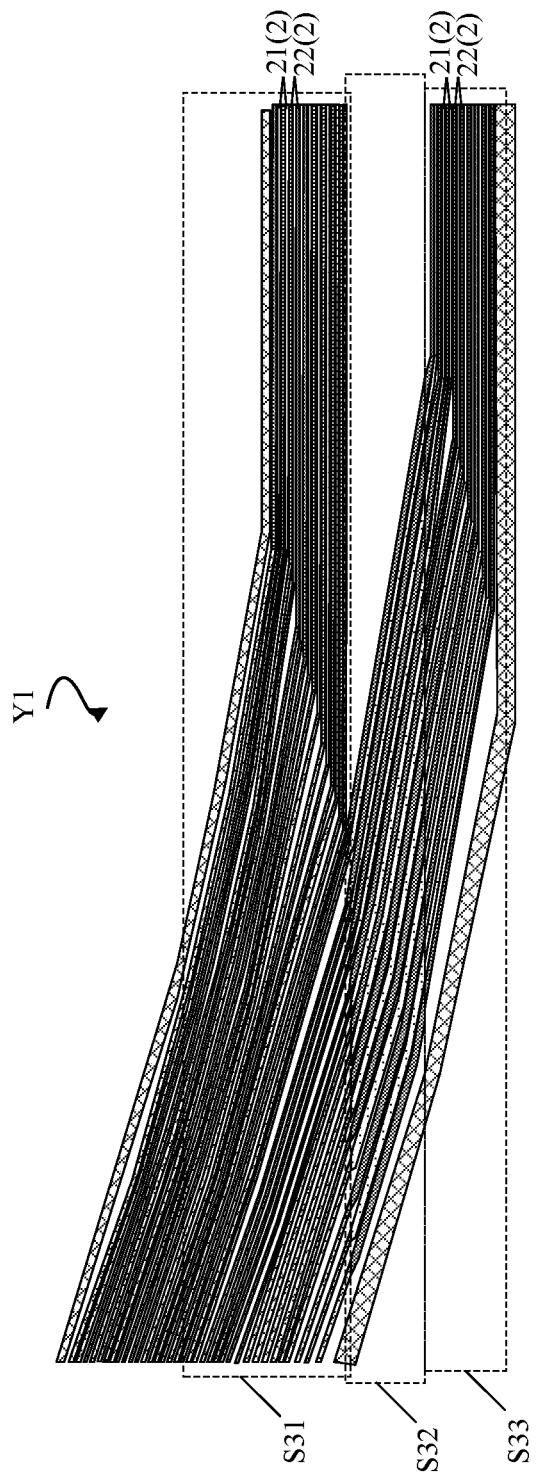
FIG. 5A is another enlarged view of the touch trace 2 in the first corner area Y1 from left on the left side of the bottom bezel in FIG. 2.
Figure 5B:
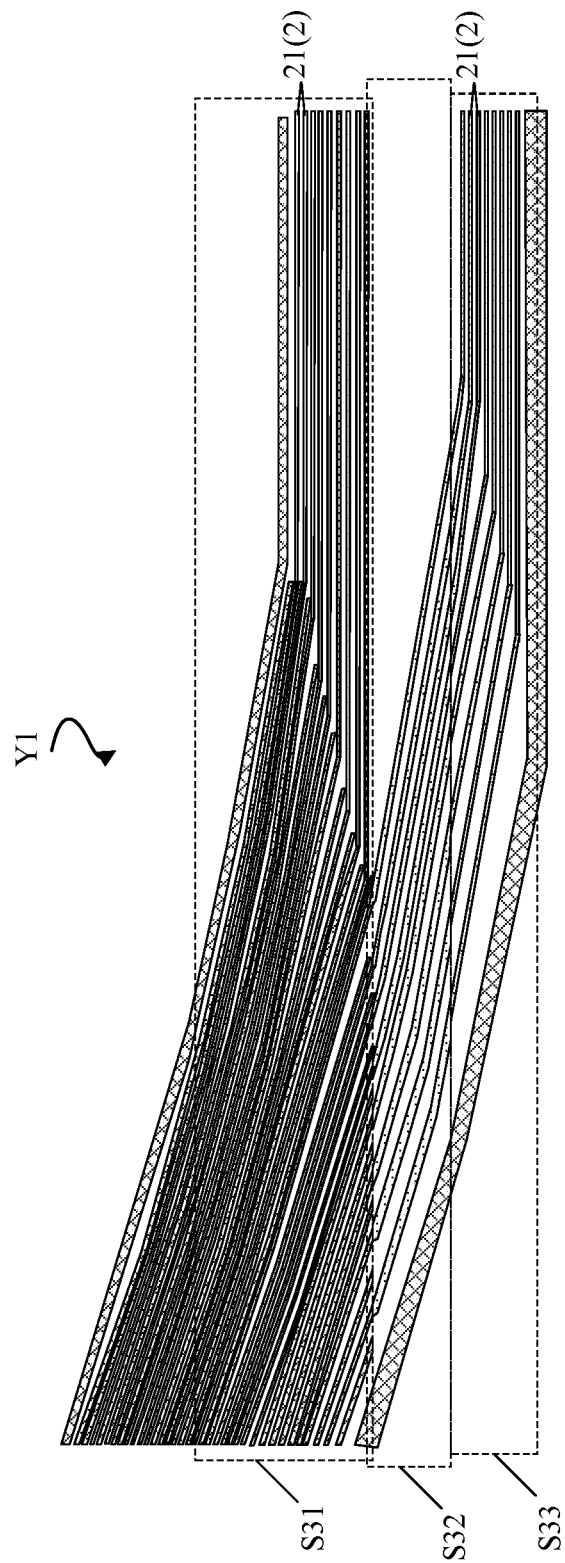
FIG. 5B shows a schematic diagram of one of the trace layers in FIG. 5A.
Figure 5C:
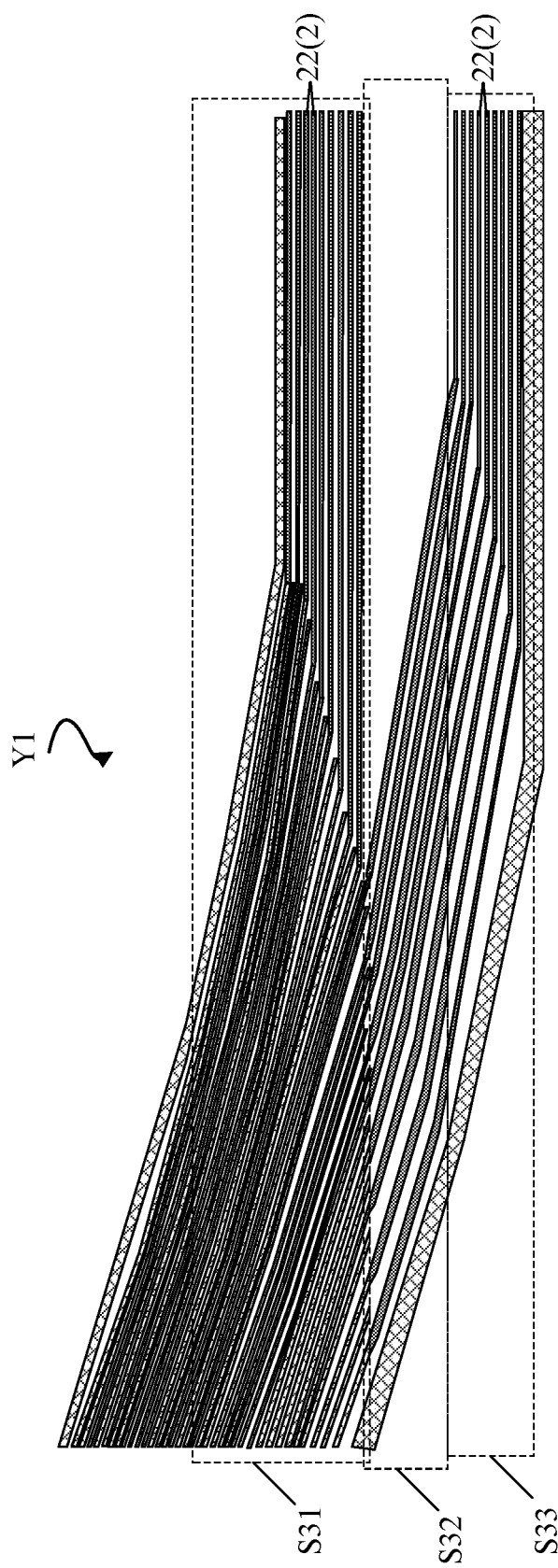
FIG. 5C shows a schematic diagram of another trace layer in FIG. 5A.

For another example, FIG. 5A to FIG. 5C each is an enlarged view of the touch trace 2 in the first corner area Y1 from left on the left side of the bottom bezel in FIG. 2, where FIG. 5B shows a schematic diagram of one of the trace layers in FIG. 5A. FIG. 5C shows a schematic diagram of another trace layer in FIG. 5A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 5B; the second layer of touch traces 22 is disposed in the second metal layer, as shown in FIG. 5C; and the first layer of touch traces 21 and the second layer of touch traces 22 are arranged alternately. Specifically, in combination with FIG. 5A to FIG. 5C, the upper touch traces 2 and lower the touch traces 2 in the first corner area Y1 from left on the left side of the bottom bezel in FIG. 2 (for example, in combination with FIG. 10A to FIG. 10C, the touch traces 2 above the first dam structure 31 and the touch traces 2 below the first dam structure 31) may all be arranged to be single-layered traces, adjacent single-layered touch traces 2 are disposed in different layers.

Figure 6A:
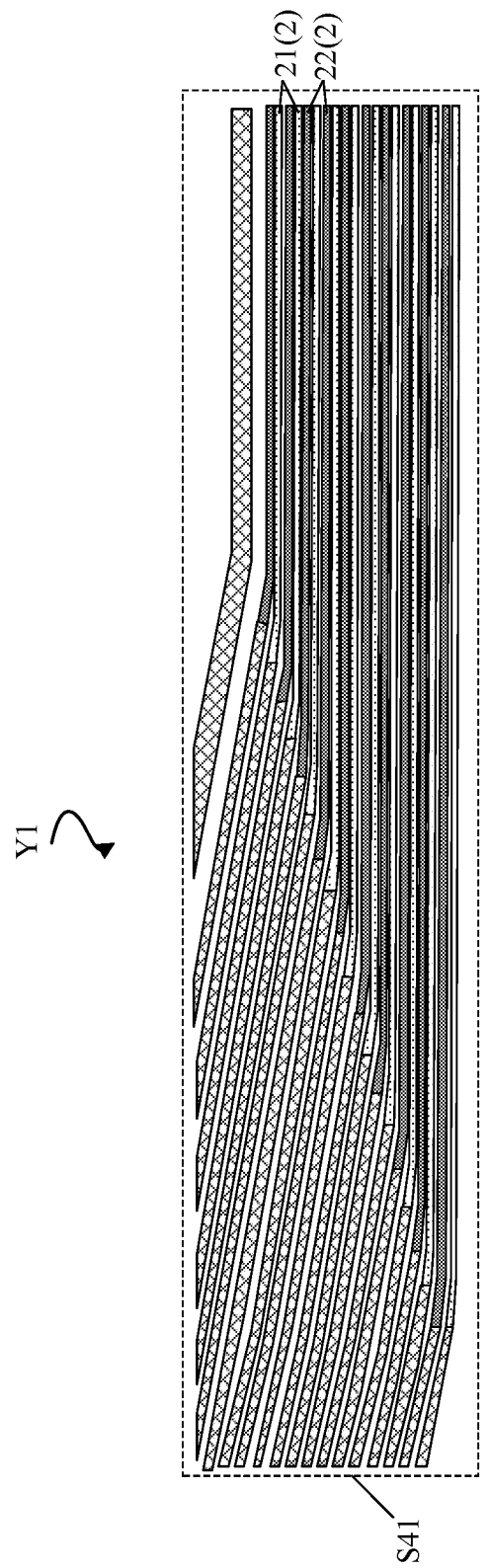
FIG. 6A is another enlarged view of the touch trace 2 in the first corner area Y1 from left on the left side of the bottom bezel in FIG. 2.
Figure 6B:
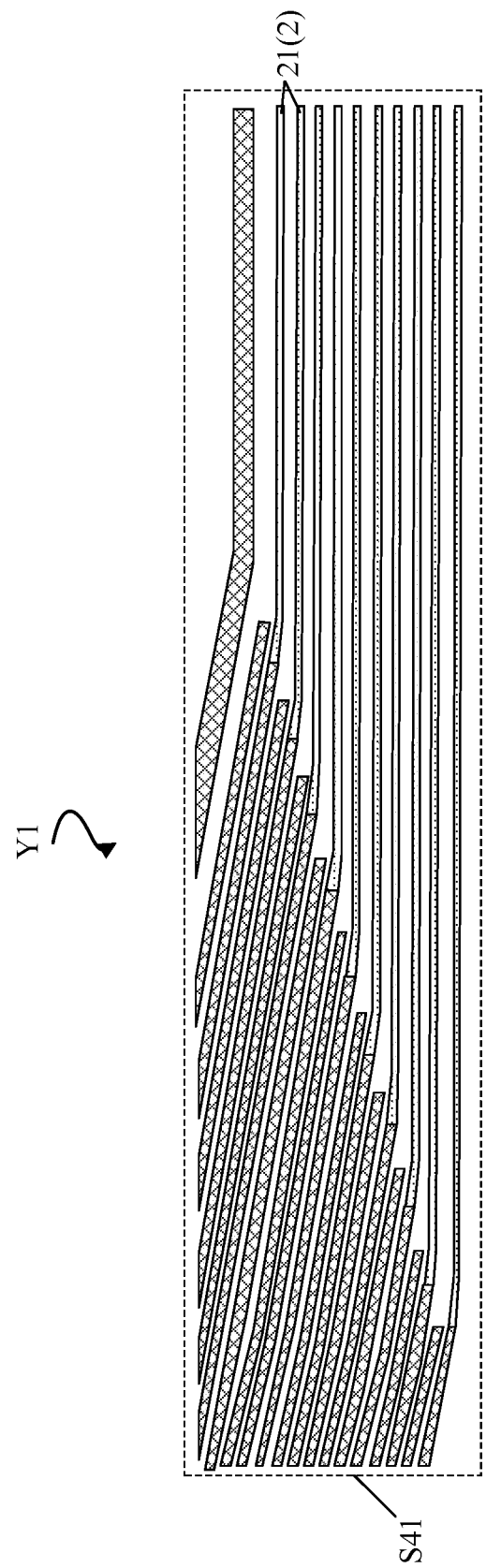
FIG. 6B shows a schematic diagram of one of the trace layers in FIG. 6A.
Figure 6C:
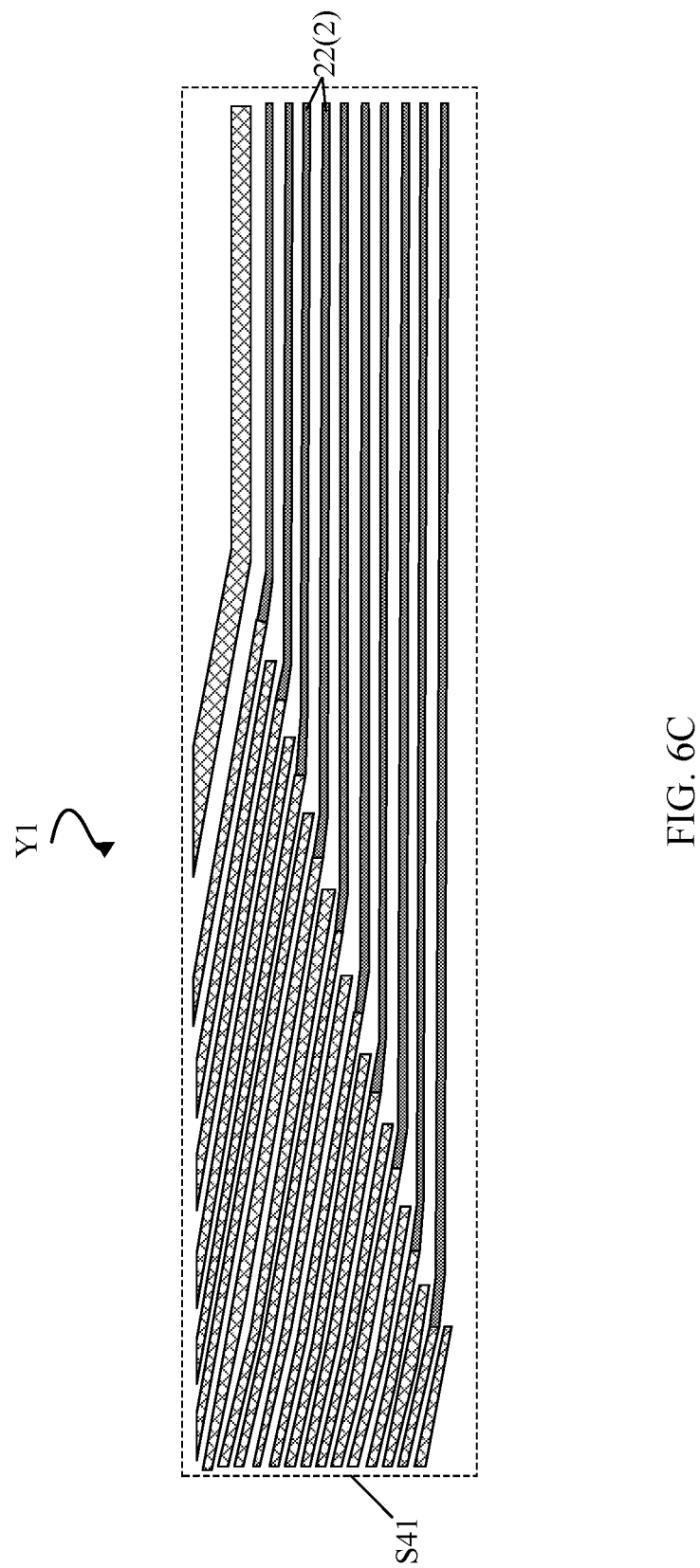
FIG. 6C shows a schematic diagram of another trace layer in FIG. 6A.

For another example, FIG. 6A to FIG. 6C each is an enlarged view of the touch trace 2 in the first corner area Y1 from left on the left side of the bottom bezel in FIG. 2, where FIG. 6B shows a schematic diagram of one of the trace layers in FIG. 6A. FIG. 6C shows a schematic diagram of another trace layer in FIG. 6A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 6B; the second layer of touch traces 22 is disposed in the second metal layer, as shown in FIG. 6C; and the first layer of touch traces 21 and the second layer of touch traces 22 are arranged alternately. Specifically, in combination with FIG. 6A to FIG. 6C, only part of the touch traces 2 in the upper part of the first corner area Y1 from left on the left side of the bottom bezel in FIG. 2 (for example, in combination with FIG. 11A to FIG. 11C, the touch traces 2 above the first dam structure 31) may be arranged to be single-layered traces, and adjacent single-layered touch traces 2 are disposed in different layers.

Figure 7A:
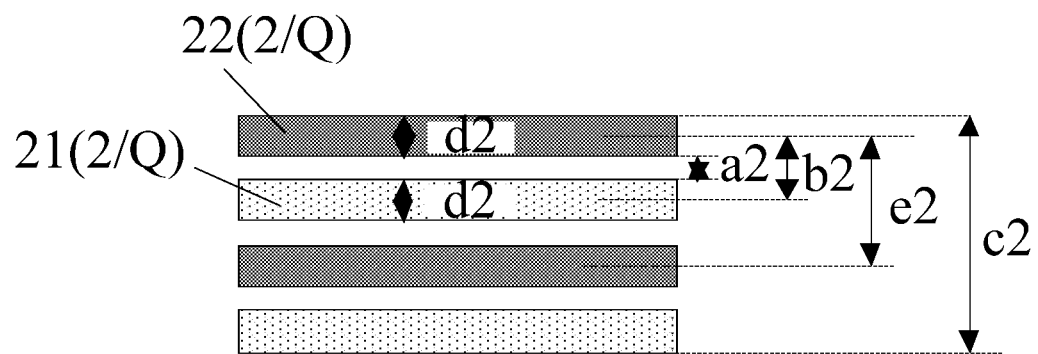
FIG. 7A is an enlarged view of the structure in a dotted circle in FIG. 3A.
Figure 7B:
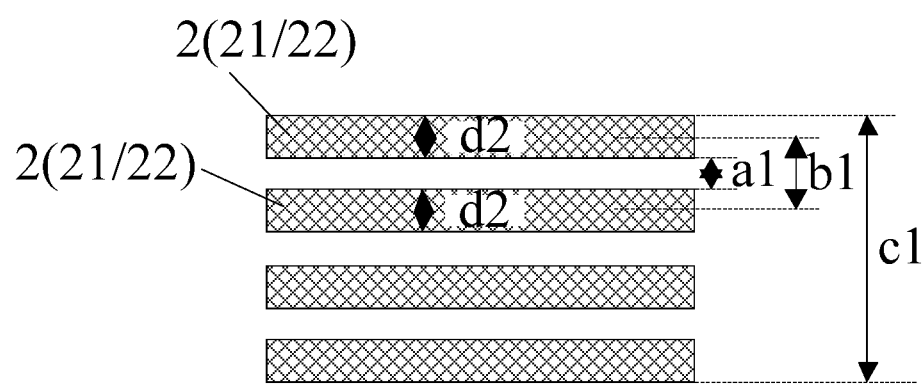
FIG. 7B is a comparative schematic diagram when each touch trace 2 is a double-layered trace.

In an embodiment of the disclosure, in at least one corner area Y, at least part of the touch traces 2 are single-layered traces, and adjacent single-layered touch traces 2 are disposed in different layers. That is, in at least one corner area Y, at least part of the touch traces 2 are converted from double-layered traces to single-layered traces. Since adjacent single-layered touch traces 2 are disposed in different layers, the spacing between adjacent touch traces 2 in the same layer is relatively large. The probability of contact is low, the risk of poor manufacturing is low, and the center spacing can be reduced compared with the previous double layers (for example, as shown in FIG. 7A and FIG. 7B, where FIG. 7A is an enlarged view of a dotted circle X1 in FIG. 3A, and FIG. 7B is a comparative schematic diagram when each touch trace 2 is a double-layered trace, and the gap distance between two adjacent touch traces 2 can be reduced under the condition that the line width d2 of a single touch trace 2 remains unchanged. That is, the gap distance a1 between adjacent touch traces 2 when the touch traces 2 are double-layered touch traces 2 can be reduced to a gap distance a2 between adjacent touch traces 2 when the single-layered touch traces 2 and the double-layered touch traces 2 are arranged alternately, and a1 is greater than a2, and further the center distance b1 between adjacent touch traces 2 when the touch traces 2 are double-layered touch traces 2 can be reduced to a center distance b2 when the single-layered touch traces 2 and the double-layered touch traces 2 are arranged alternately, b1=a1+d2, b2=a1+d2, b1 is greater than b2), thereby reducing as a whole the vertical layout width of a plurality of touch traces 2 in directions perpendicular to their extending directions (reducing from a distance c1 when the touch traces are double-layered touch traces 2 to a distance c2 when single-layered touch traces 2 and double-layered touch traces 2 are arranged alternately, c1>c2), and wiring of a plurality of touch traces 2 in a small space can be realized. Further, since the touch traces 2 changes to single-layered touch traces, actually, the center spacing e2 between adjacent touch traces 2 in the same layer is further increased, thereby greatly reducing the process risk.

Specifically, as shown in FIG. 2, the touch display panel further includes a bending area DD, and the bonding area CC may also be provided with a first control chip IC1 and a second control chip IC2. Specifically, the area of the side of the bending area CC facing away from the display area AA may be brought to a back side of the touch display panel by bending; the first control chip IC may be configured to control light emitting display of the display area; and the second control chip IC2 may be configured to control the touch.

In one possible implementation, adjacent single-layered touch traces 2 are disposed in two conducting layers. Specifically, for example, in combination with FIG. 3A, according to the arrangement direction of the touch traces 2 (such as the direction from top to bottom in the upper first dotted box S11 in FIG. 3A), odd-numbered rows of touch traces 2 may be disposed in the first metal layer and even-numbered rows of touch traces 2 may be disposed in the second metal layer; alternatively, even-numbered rows of touch traces 2 may be disposed in the first metal layer and odd-numbered rows of touch traces 2 may be disposed in the second metal layer. Compared with setting of the touch traces 2 in more than two layers, in the embodiment of the disclosure, adjacent single-layered touch traces 2 are arranged in two conducting layers, thereby realizing layout of a plurality of touch traces 2 in a smaller space, reducing the process risk, and further simplifying the wiring complexity of the touch traces 2.

Figure 8:
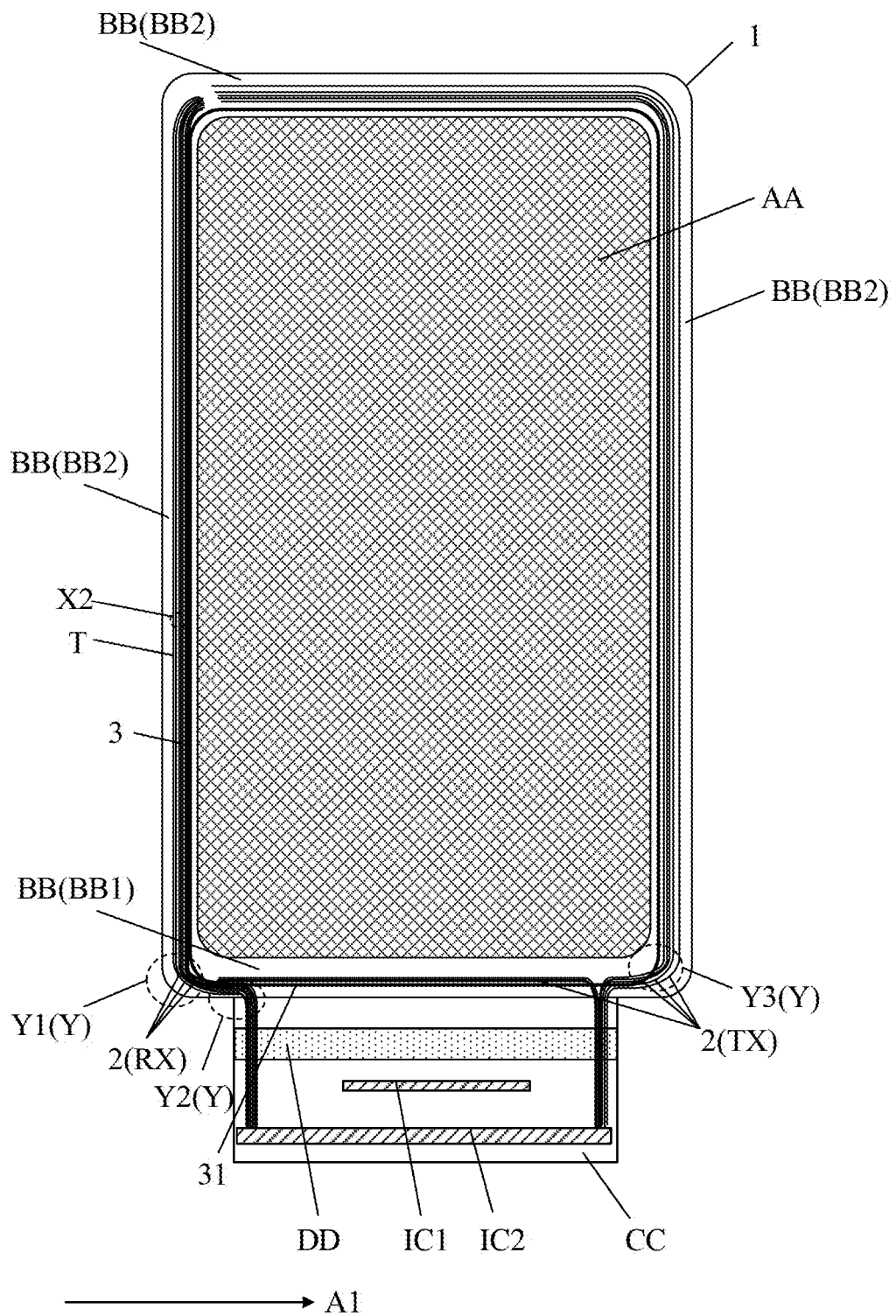
FIG. 8 is a second schematic diagram of a top view of a touch display panel according to an embodiment of the disclosure.

In one possible implementation, as shown in FIG. 8, the touch display panel further includes a dam structure 3 between the base substrate 1 and the touch structural layer. The dam structure 3 includes a first dam structure 31 in the bezel area BB connected with the bonding area CC and extending along the first direction A1; and in at least one corner area Y, the touch traces 2 are at least distributed at a side of the first dam structure 31 facing away from the bonding area CC. Specifically, as shown in FIG. 9A to FIG. 12, the first dam structure 31 may include a plurality of sub-dam structures, for example, the first dam structure 31 may include a first sub-dam structure 311 and a second sub-dam structure 312, where the first sub-dam structure 311 may be disposed at a side of the second sub-dam structure 312 facing the display area AA.

Figure 9A:
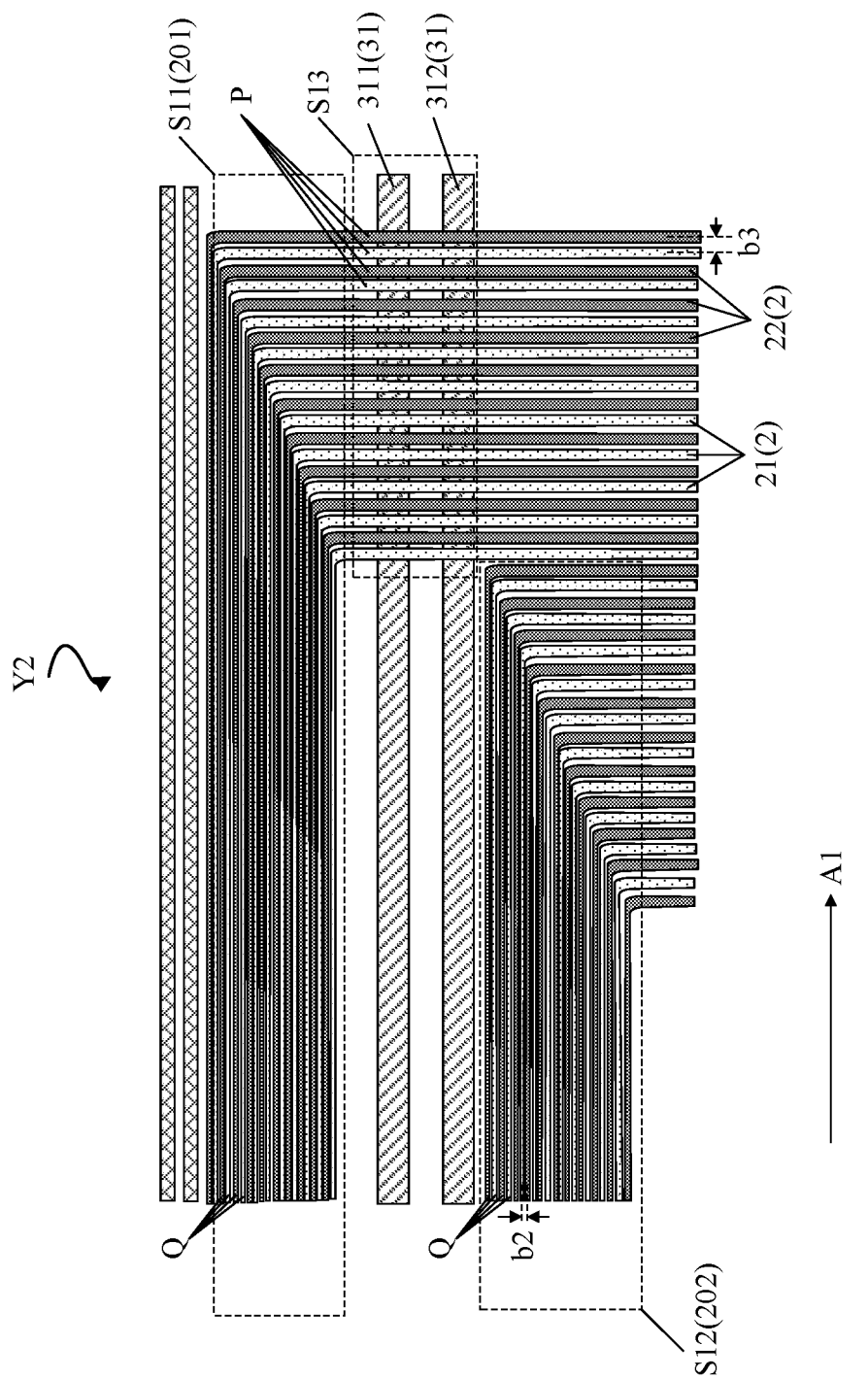
FIG. 9A is an enlarged view of the touch trace 2 in the second corner area Y2 from left on the left side of the bottom bezel of FIG. 8.
Figure 9B:
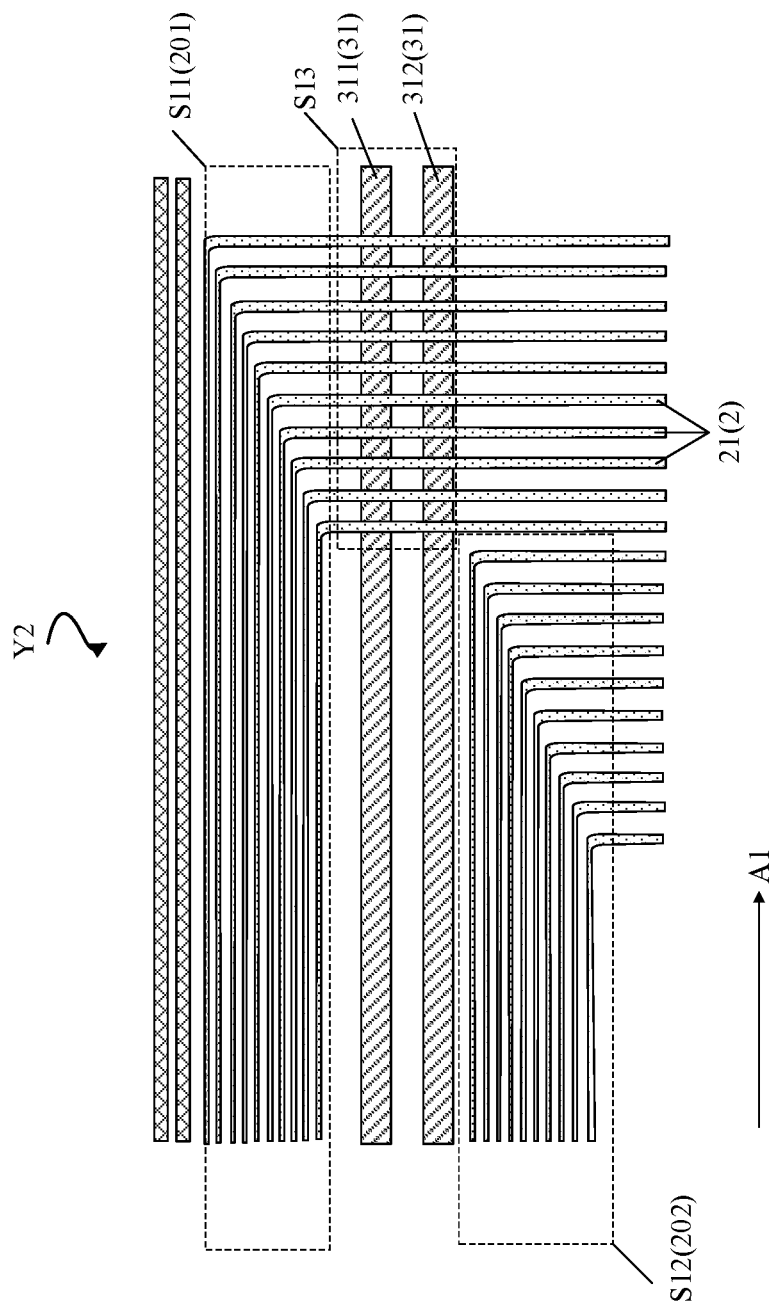
FIG. 9B shows a schematic diagram of one of the trace layers in FIG. 9A.
Figure 9C:
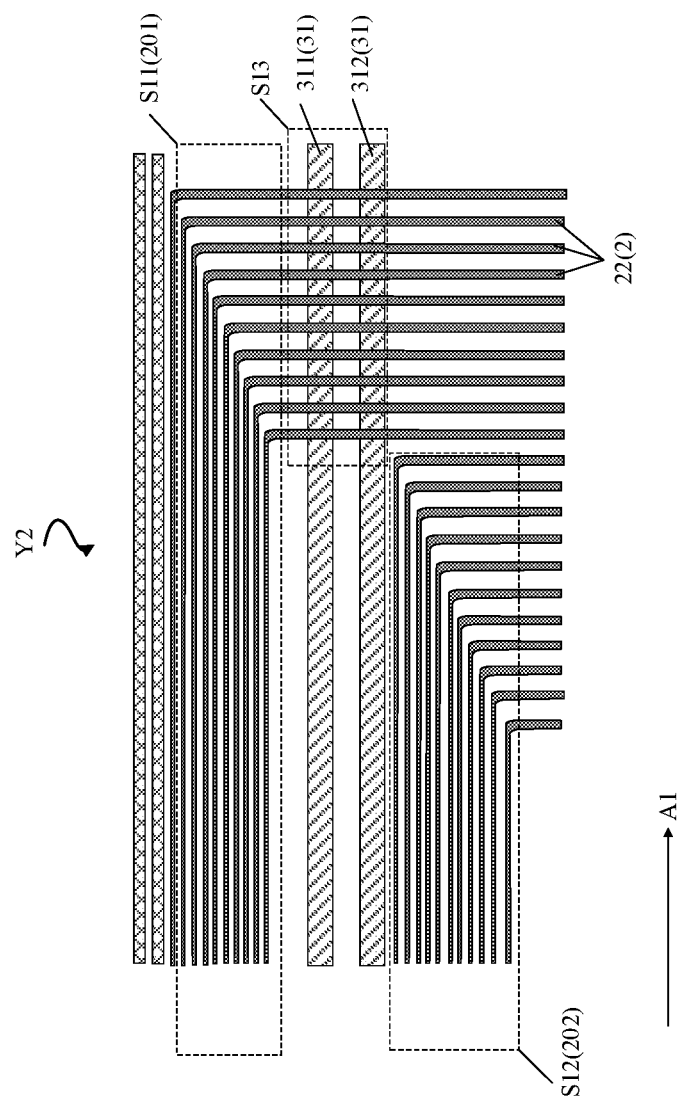
FIG. 9C shows a schematic diagram of another trace layer in FIG. 9A.

Specifically, for example, FIG. 9A to FIG. 9C each is an enlarged view of the touch trace 2 in the second corner area Y2 from left on the left side of the bottom bezel of FIG. 8, where FIG. 9B shows a schematic diagram of one of the trace layers in FIG. 9A, FIG. 9C shows a schematic diagram of another trace layer in FIG. 9A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 9B; the second layer of touch traces 22 is disposed in the second metal layer, as shown in FIG. 9C; and the first layer of touch traces 21 and the second layer of touch traces 22 are arranged alternately. As shown in FIG. 9A to FIG. 9C, the touch traces 2 may be divided into two groups, one of the groups (that is, the touch traces 2 in the upper dotted box S11 in FIG. 9A) is distributed at a side of the first dam structure 31 facing away from the bonding area CC (that is, distributed above the first dam structure 31 in FIG. 9A), and the other group (that is, the touch traces 2 in the lower dotted box S12 in FIG. 9A) is distributed at a side of the first dam structure 31 facing the bonding area CC (that is, distributed below the first dam structure 31 in FIG. 9A).

Figure 10A:
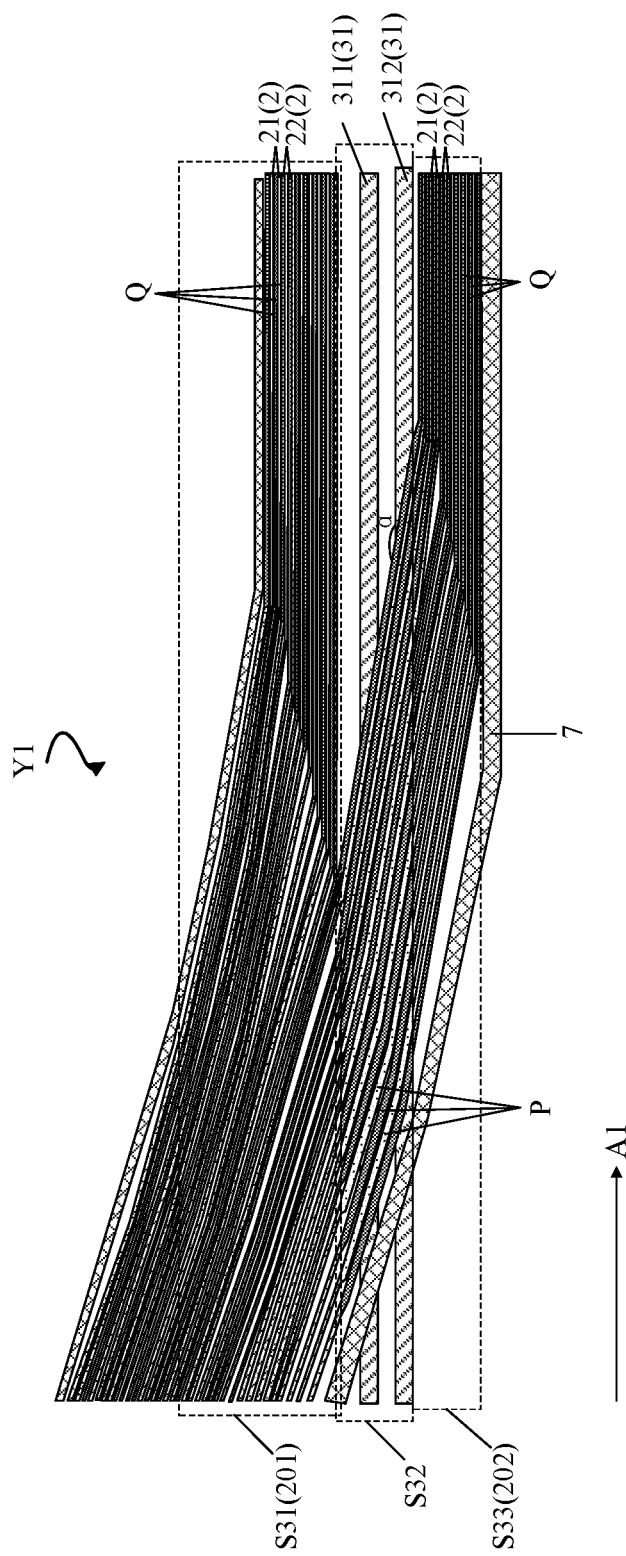
FIG. 10A is another enlarged view of the touch trace 2 in the first corner area Y1 from left on the left side of the bottom bezel of FIG. 8.
Figure 10B:
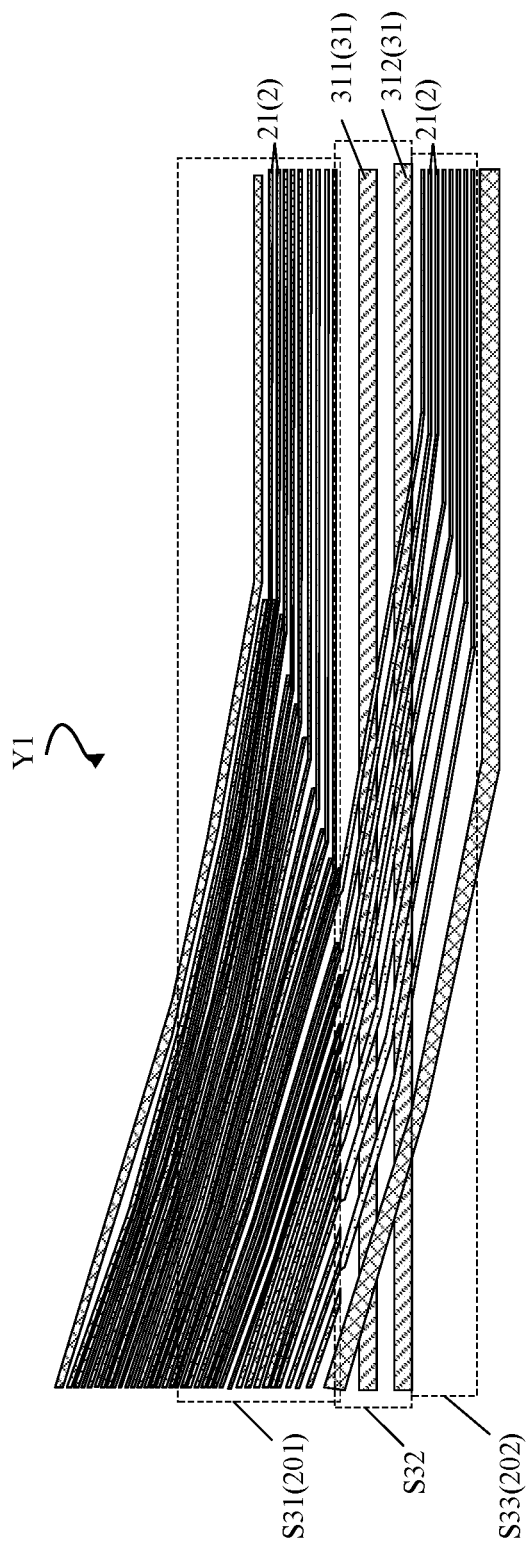
FIG. 10B shows a schematic diagram of one of the trace layers in FIG. 10A.
Figure 10C:
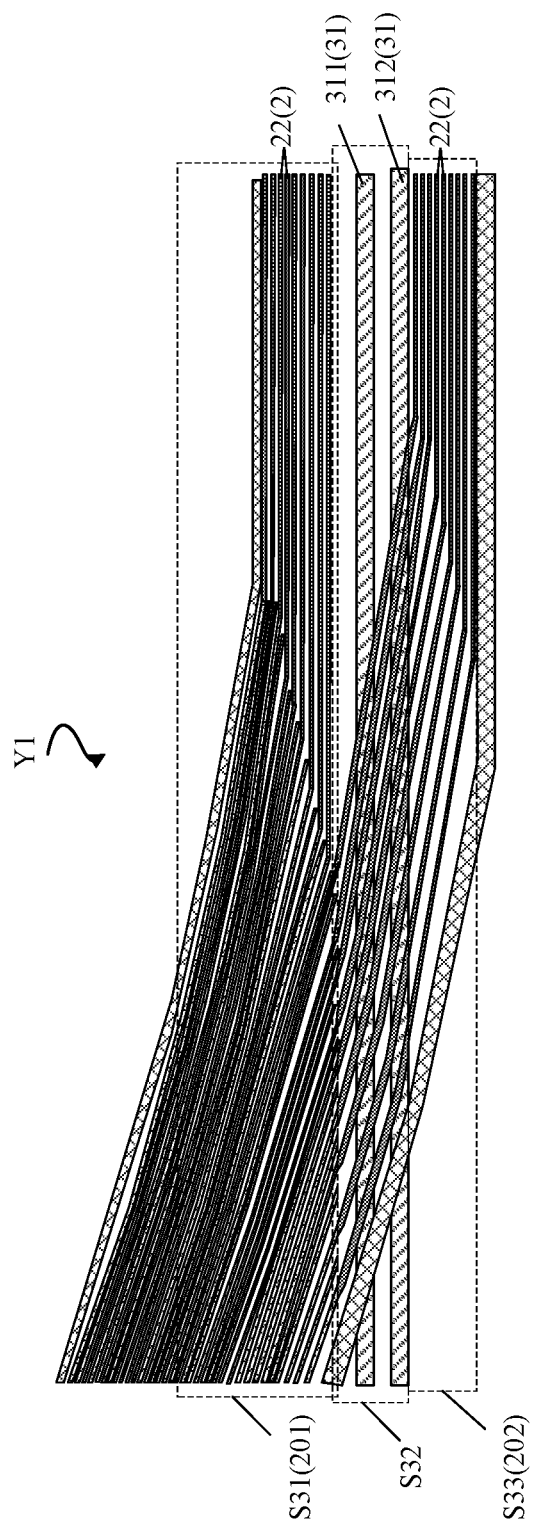
FIG. 10C shows a schematic diagram of another trace layer of FIG. 10A.

For another example, FIG. 10A to FIG. 10C each is an enlarged view of the touch trace 2 in the first corner area Y1 from left on the left side of the bottom bezel of FIG. 8, where FIG. 10B shows a schematic diagram of one of the trace layers in FIG. 10A, FIG. 10C shows a schematic diagram of another trace layer of FIG. 10A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 10B; the second layer of touch traces 22 is disposed in the second metal layer, as shown in FIG. 10C; and the first layer of touch traces 21 and the second layer of touch traces 22 are arranged alternately. As shown in FIG. 10A to FIG. 10C, the touch traces 2 may be divided into two groups, one of the groups (that is, the touch traces 2 in the upper dotted box S31 in FIG. 10A) is distributed at a side of the first dam structure 31 facing away from the bonding area CC (that is, distributed above the first dam structure 31 in FIG. 10A), and the other group (that is, the touch traces 2 in the lower dotted box S33 in FIG. 10A) is distributed at a side of the first dam structure 31 facing the bonding area CC (that is, distributed below the first dam structure 31 in FIG. 10A).

Figure 11A:
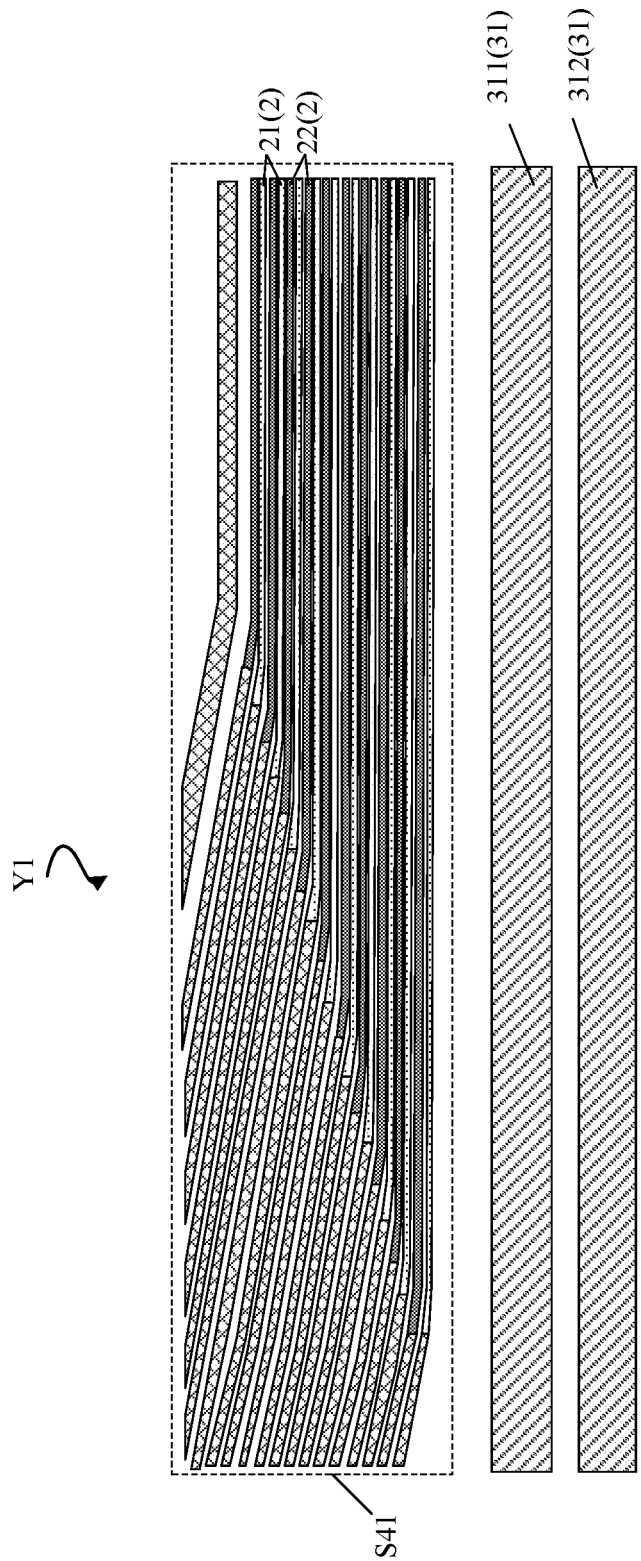
FIG. 11A is another enlarged view of the touch trace 2 in the first corner area Y1 from left on the left side of the bottom bezel of FIG. 8.
Figure 11B:
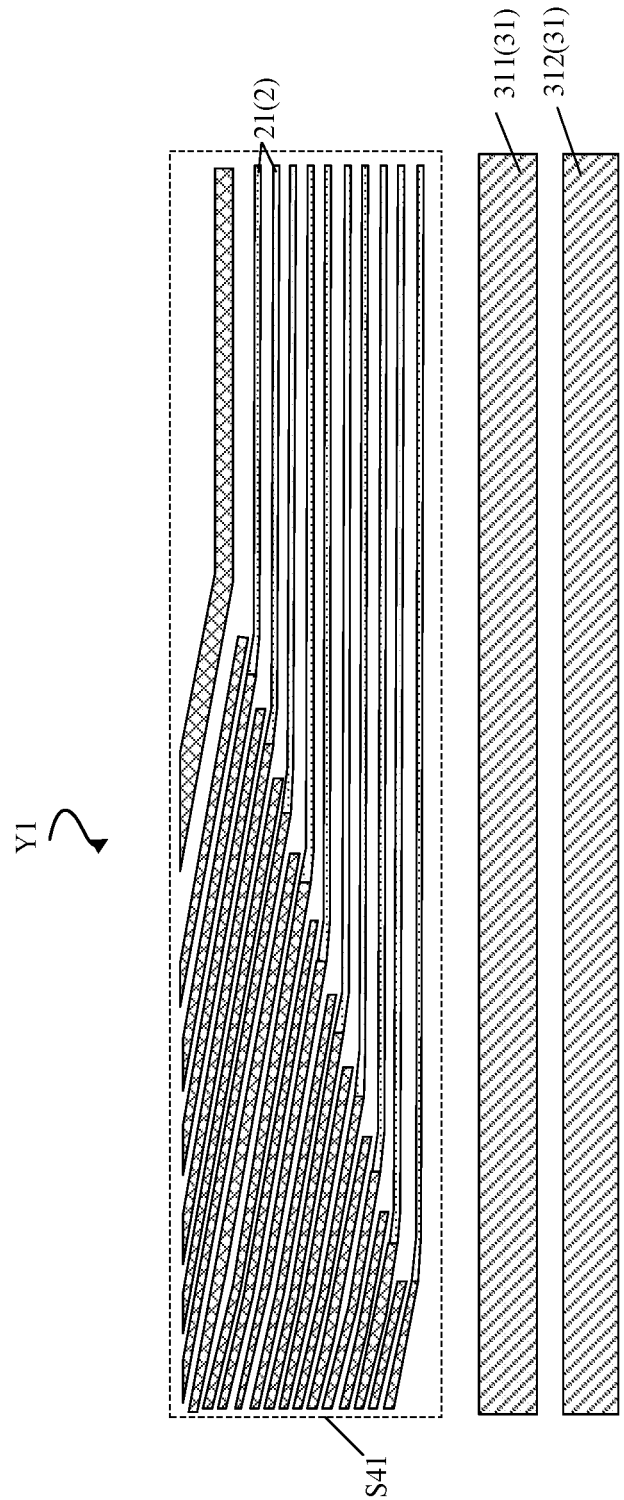
FIG. 11B shows a schematic diagram of one of the trace layers in FIG. 11A.
Figure 11C:
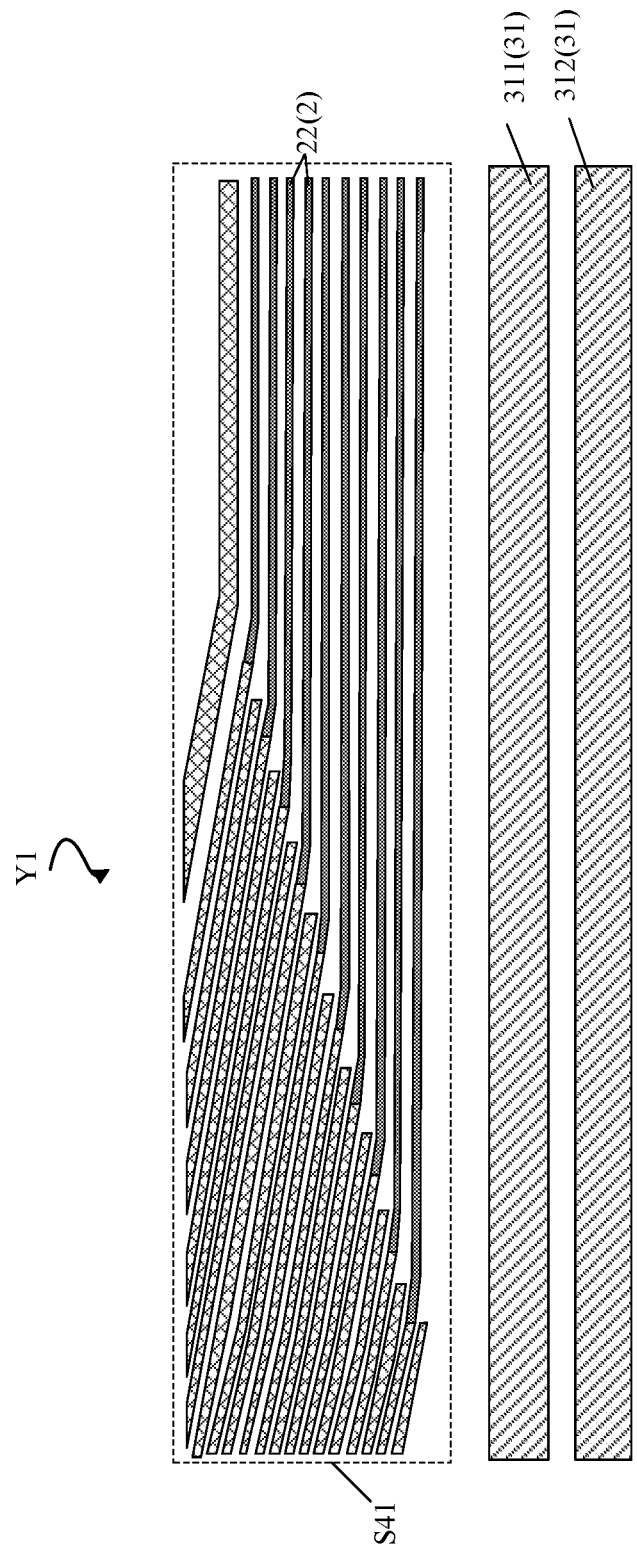
FIG. 11C shows a schematic diagram of another trace layer of FIG. 11A.

For another example, FIG. 11A to FIG. 11C each is an enlarged view of the touch trace 2 in the first corner area Y1 from left on the left side of the bottom bezel of FIG. 8, where FIG. 11B shows a schematic diagram of one of the trace layers in FIG. 11A, FIG. 11C shows a schematic diagram of another trace layer of FIG. 11A. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 11B; the second layer of touch traces 22 is disposed in the second metal layer, as shown in FIG. 11C; and the first layer of touch traces 21 and the second layer of touch traces 22 are arranged alternately. As shown in FIG. 11A to FIG. 11C, the touch traces 2 (such as the touch traces 2 in the dotted box S41 in FIG. 11A) are all distributed at a side of the first dam structure 31 far away from the bonding area CC (such as above the first wall retaining structure 31 in FIG. 11A). This embodiment can be applied to a case that there is a larger space in the area above the first dam structure 31, and the touch traces 2 are all designed at a side of the first dam structure 31 facing away from the bonding area CC, adjacent touch traces 2 are in different metal layers. In this case, in the same layer, the center spacing between adjacent touch traces 2 is large, thereby satisfying the process requirements.

Figure 12:
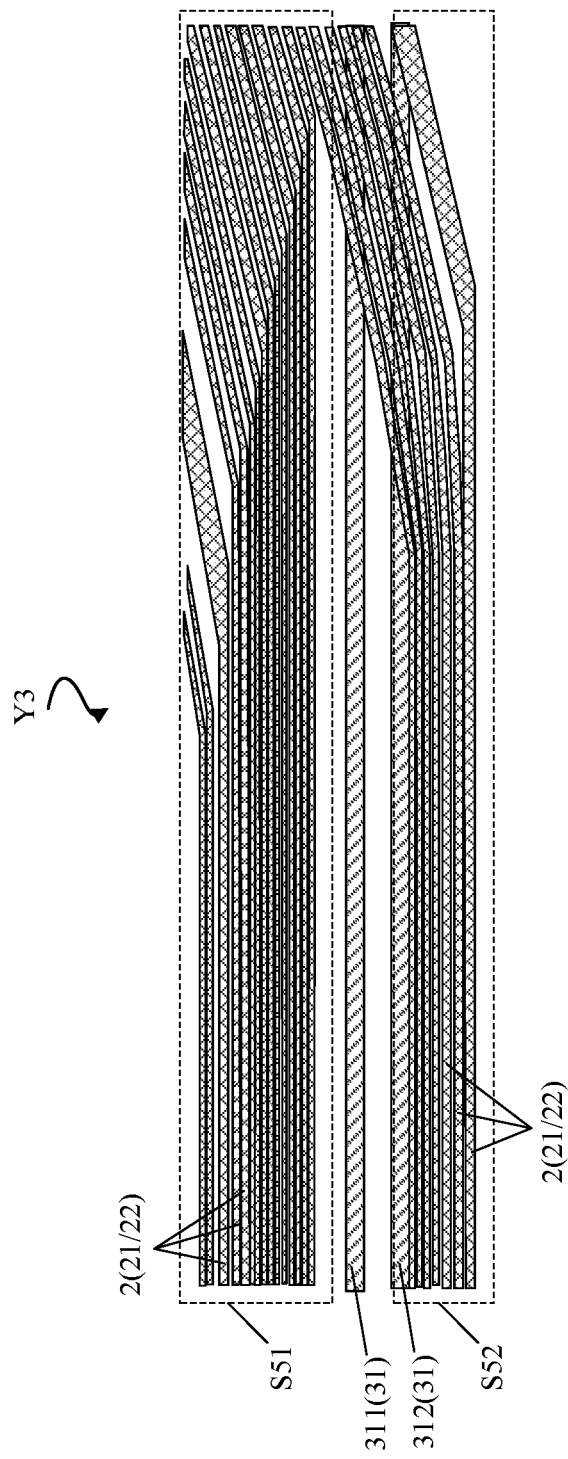
FIG. 12 is another enlarged view of the touch trace 2 in the first corner area Y3 from right on the right side of the bottom bezel of FIG. 8.

For another example, FIG. 12 is an enlarged view of the touch trace 2 in the first corner area Y3 from right on the right side of the bottom bezel of FIG. 8, the touch traces 2 are double-layered traces. As shown in FIG. 12, the touch traces 2 are divided into two groups, one of the groups (that is, the touch traces 2 in the upper dotted box S51 in FIG. 12) is distributed at a side of the first dam structure 31 facing away from the bonding area CC (that is, above the first dam structure 31 in FIG. 12), and the other group (that is, the touch traces 2 in the lower dotted box S52 in FIG. 12) is distributed at a side of the first dam structure 31 facing the bonding area CC (that is, below the first dam structure 31 in FIG. 12). This embodiment may be applied to a touch display panel with the bottom bezel having a greater space than the bottom bezel in the aforementioned cases, and the touch traces 2 may all be designed to be double-layered metal, to reduce resistance.

Figure 9D:
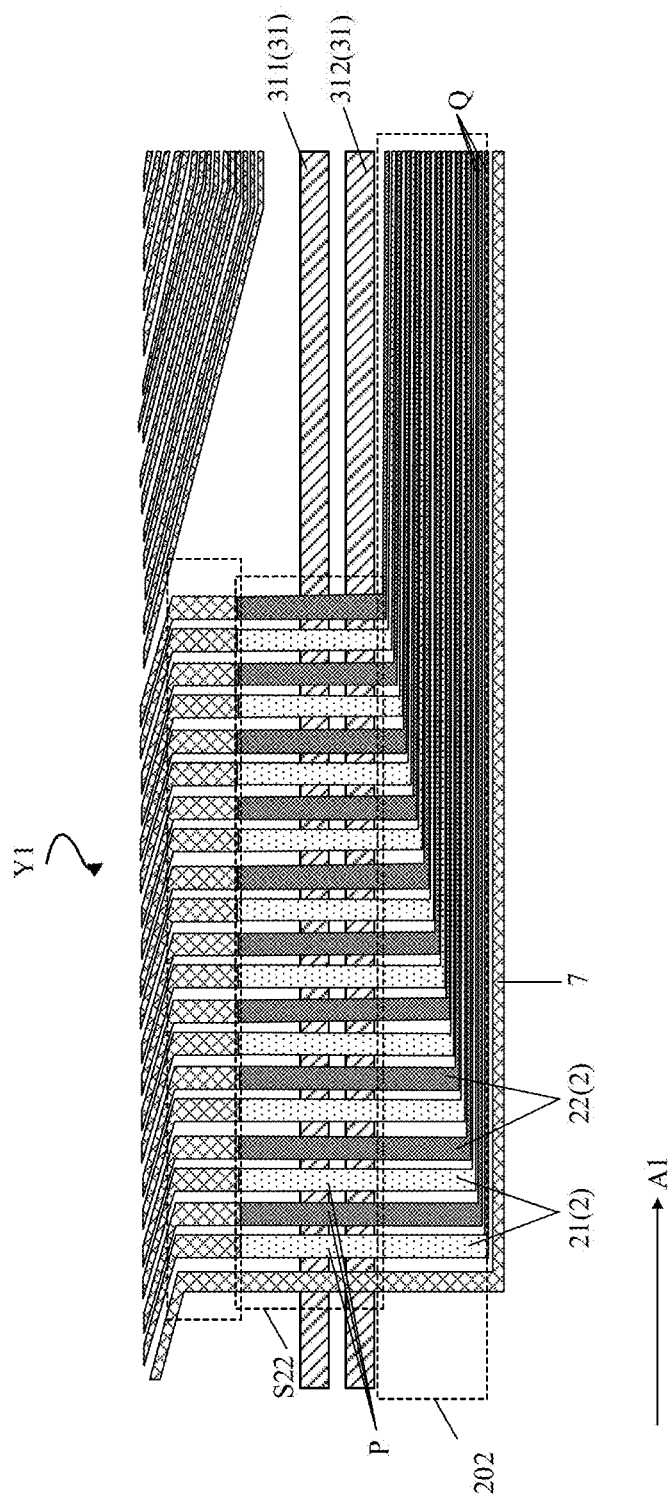
FIG. 9D is an enlarged view of the touch trace 2 in the first corner area Y1 from left on the left side of the bottom bezel of FIG. 8.
Figure 9E:
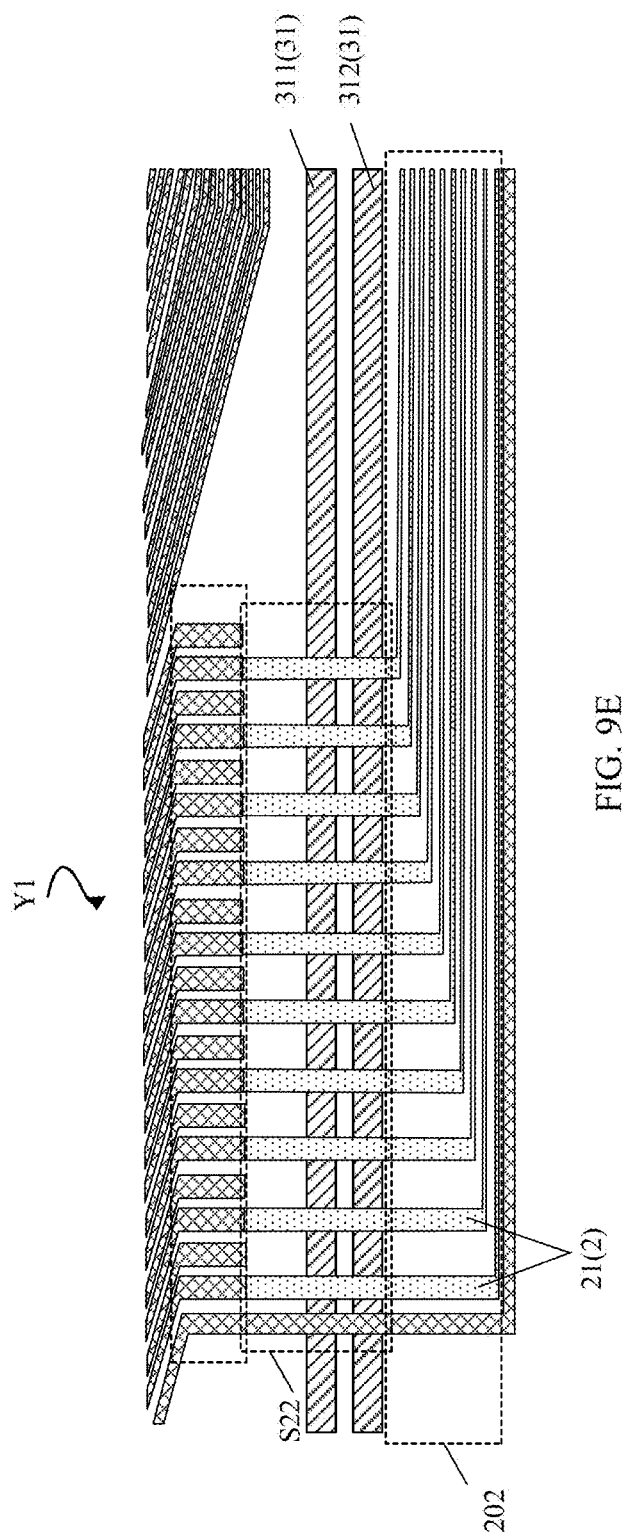
FIG. 9E shows a schematic diagram of one of the trace layers in FIG. 9D.
Figure 9F:
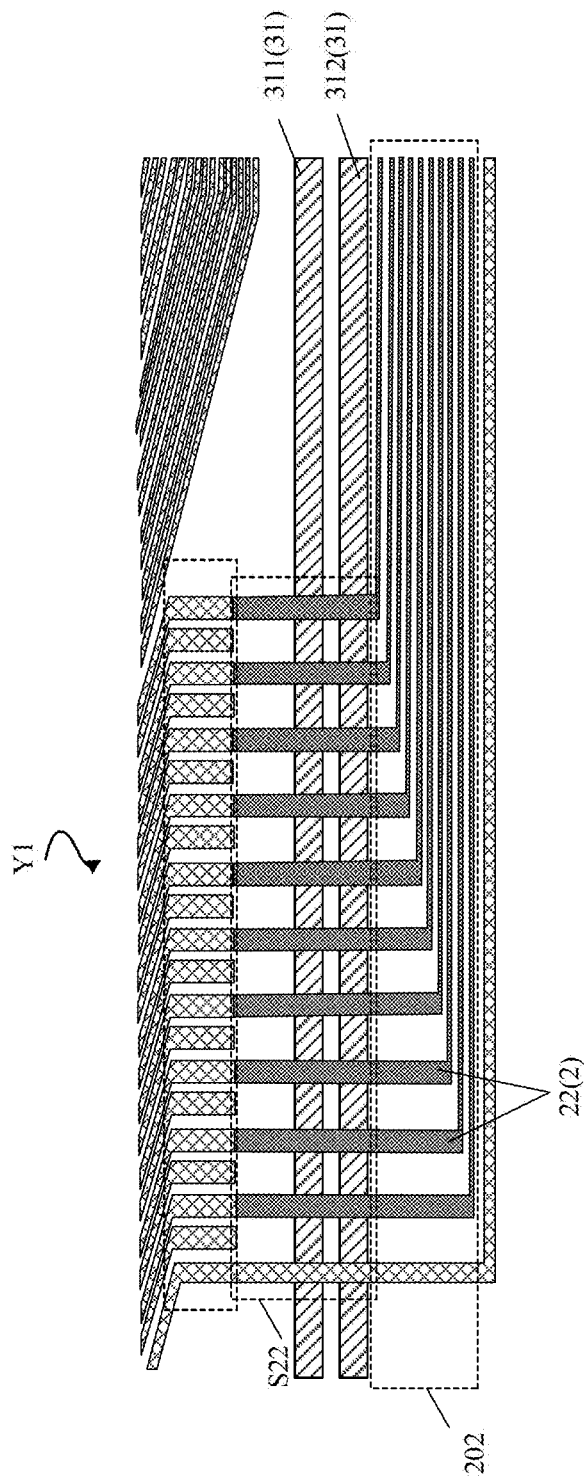
FIG. 9F shows a schematic diagram of another trace layer in FIG. 9D.

In one possible implementation, FIG. 9D to FIG. 9F each is an enlarged view of the touch trace 2 in the first corner area Y1 from left on the left side of the bottom bezel of FIG. 8, where FIG. 9E shows a schematic diagram of one of the trace layers in FIG. 9D, FIG. 9F shows a schematic diagram of another trace layer in FIG. 9D. The touch traces 2 may include a first layer of touch traces 21 and a second layer of touch traces 22, where the first layer of touch traces 21 and the second layer of touch traces 22 are disposed in different layers. For example, the first layer of touch traces 21 is disposed in the first metal layer, as shown in FIG. 9E; the second layer of touch traces 22 is disposed in the second metal layer, as shown in FIG. 9F; and the first layer of touch traces 21 and the second layer of touch traces 22 are arranged alternately. The touch traces 2 may be distributed at a side of the first dam structure 31 facing the bonding area CC.

In one possible implementation, in at least one corner area Y, all the touch traces 2 are distributed at a side of the first dam structure 31 facing away from the bonding area CC. For example, in combination with FIG. 11A, in the first corner area Y1 from left on the left side of the lower box in FIG. 8, all the touch traces 2 are distributed at a side of the first dam structure 31 facing away from the bonding area CC.

In one possible implementation, in combination with FIG. 9A and FIG. 10A, in at least one corner area Y, the touch traces 2 include a first touch trace group 201 at a side of the first dam structure 31 facing away from the bonding area CC, and a second touch trace group 202 at a side of the first dam structure 31 close to the bonding area CC. In the embodiments of the disclosure, the touch traces 2 are distributed at different sides of the first dam structure 31, thereby avoiding the risk of poor touch traces 2 due to limited wiring space of the touch traces 2 when the touch traces 2 are distributed at the side of the first dam structure 31 facing away from the bonding area CC.

Specifically, for example, as shown in FIG. 9A, in the second corner area Y2 from left on the left side of the bottom bezel in FIG. 8, the touch traces 2 are distributed at different sides of the first dam structure 31, and include the first touch trace group 201 at a side of the first dam structure 31 facing away from the bonding area CC, and a second touch trace group 202 at a side of the first dam structure 31 facing away from the bonding area CC, thereby reducing the risk of poor touch traces 2.

For another example, as shown in FIG. 10A, in the first corner area Y1 from left on the left side of the bottom bezel in FIG. 8, the touch traces 2 are distributed at different sides of the first dam structure 31, and include the first touch trace group 201 at a side of the first dam structure 31 facing away from the bonding area CC, and a second touch trace group 202 at a side, of the first dam structure 31 close to the bonding area CC, thereby reducing the risk of poor touch traces 2.

In one possible implementation, in the first touch trace group 201, the touch traces 2 are single-layered traces, and adjacent single-layered touch traces 2 are disposed in different layers.

In one possible implementation, in the second touch trace group 202, at least part of the touch traces 2 are single-layered traces, and adjacent single-layered touch traces 2 are disposed in different layers.

In one possible implementation, in the first touch trace group 201 and the second touch trace group 202, the touch traces 2 are single-layered traces, and adjacent single-layered touch traces 2 are disposed in different layers.

In one possible implementation, in combination with FIG. 9A, FIG. 9D and FIG. 10A, the touch traces 2 include bridge trace parts P correspondingly electrically connected to each of the touch traces 2 in the second touch trace group 202 (that is, the touch traces 2 in the dotted box S13 in the middle of FIG. 9A, the touch traces 2 in the dotted box S22 in the middle of FIG. 9D, and the touch traces 2 in the dotted box S32 in the middle of FIG. 10A). An orthographic projection of the bridge trace part P on the base substrate 1 has an overlapping area with an orthographic projection of the first dam structure 31 on the base substrate 1, and an extending direction of the orthographic projection of the bridge trace part P on the base substrate 1 is intersected with the first direction A1; and at least part of the bridge trace parts P are single-layered traces, and adjacent single-layered bridge trace parts P are disposed in different layers.

During specific implementation, the bridge trace parts P may cross over the first dam structure 31 in a direction perpendicular to the dam structure or in a oblique direction relative to the dam structure. Specifically, for example, in one possible implementation, in combination with FIG. 9A to FIG. 9D, the extending direction of the bridge trace part P is perpendicular to the extending direction of the first dam structure 31. Specifically, for another example, in another possible implementation, in combination with FIG. 10A, an included angle α facing towards the display area AA and formed between bridge trace part P and the first dam structure 31 is in a range of 90° to 180°.

In one possible implementation, in combination with FIG. 9A, FIG. 9D and FIG. 10A, the first touch trace group 201 and the second touch trace group 202 both include a plurality of first trace parts Q extending along a first direction A1; in combination with FIG. 9A, a center spacing b3 of adjacent bridge trace parts P in their arrangement direction is greater than a center spacing b2 of adjacent first trace parts Q in their arrangement direction. In an embodiment of the disclosure, a center spacing b3 of adjacent bridge trace parts P in their arrangement direction is greater than a center spacing b2 of adjacent first trace parts Q in their arrangement direction, due to a segment gap between the first dam structure 31 and the surrounding part, the line width of the bridge trace part P is large, thereby reducing the risk of broken traces or poor contact when the touch traces 2 cross over the first dam structure 31.

In one possible implementation, in combination with FIG. 8, the bezel area BB includes a first bezel area BB1 extending along a first direction A1 and connected with the bonding area CC and a second bezel area BB2. Specifically, other bezel areas BB except the first bezel area BB1 may all serve as the second bezel area BB2, and the first dam structure 31 is located in the first bezel area BB1 connected with the bonding area CC. The touch traces 2 further include second trace parts T in the second bezel area BB, and at least part of the second trace parts T are double-layered traces.

Figure 13:
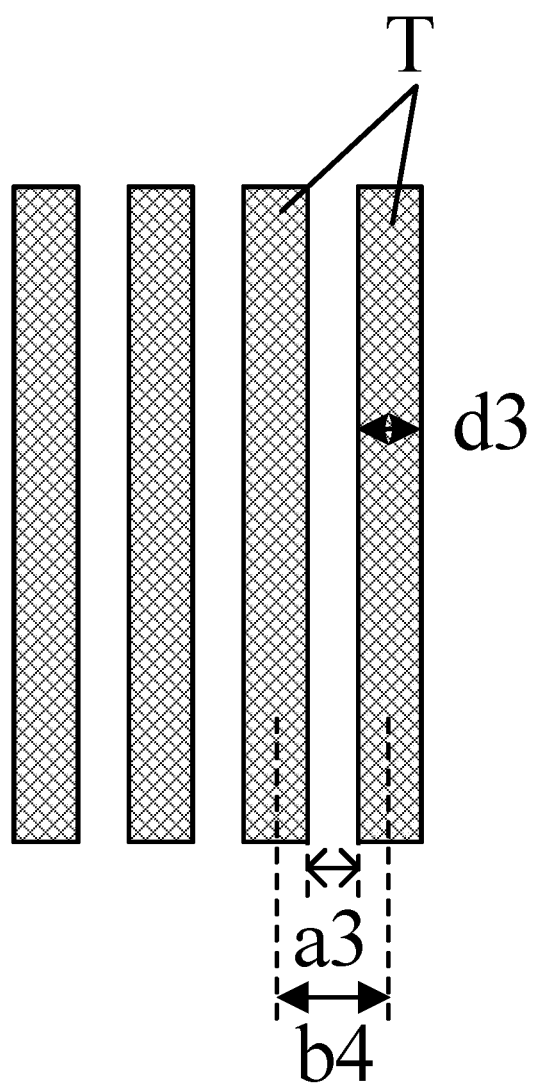
FIG. 13 is an enlarged view of the dotted coil X2 of FIG. 8.

In one possible implementation, with reference to what is shown in FIG. 13 and FIG. 7A, where FIG. 13 is an enlarged view of the dotted circle X2 of FIG. 8, and a center spacing b4 of adjacent second trace parts T in their arrangement direction is greater than a center spacing b2 of adjacent first trace parts Q in their arrangement direction. In an embodiment of the disclosure, relative to the double-layered second trace part T in the second bezel area BB2, as to the first trace parts Q with single and double layers arranged alternately, since adjacent touch traces 2 are disposed in different layers, a center spacing b2 of adjacent first trace parts Q in the arrangement direction may be reduced, to allow the first trace parts Q to have more wiring space.

In one possible implementation, in combination with FIG. 13 and FIG. 7A, the line width d3 of the second trace part T is substantially the same as the line width d2 of the first trace part Q.

In one possible implementation, the line width d3 of each second trace part T may be the same.

In one possible implementation, in combination with FIG. 13 and FIG. 7A, a gap distance a3 of adjacent two trace parts T is greater than a gap distance a2 of adjacent first trace parts Q.

In one possible implementation, the line widths d2 of all the first trace parts Q may be the same.

In one possible implementation, in combination with FIG. 7A, a center spacing e2 of the adjacent first trace parts Q of the same layer in the arrangement direction is twice a center spacing b2 of the adjacent first trace parts Q of different layers in the arrangement direction.

In one possible implementation, the touch display panel further includes a plurality of touch electrodes in the display area, and the touch electrodes are correspondingly electrically connected with the touch traces.

Figure 14A:
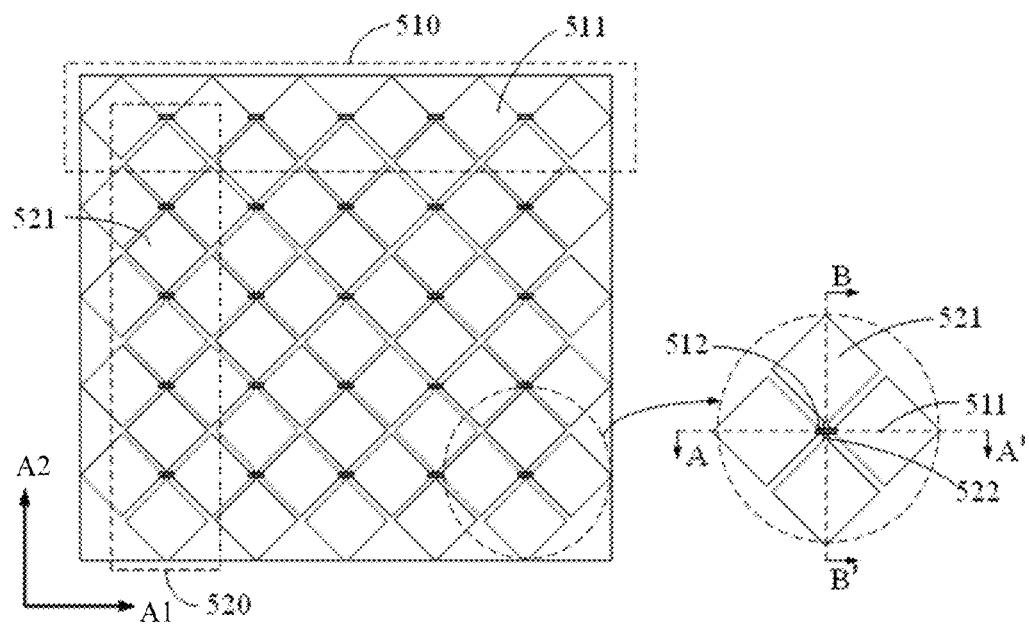
FIG. 14A is a schematic diagram of a touch electrode according to an embodiment of the disclosure.

In some embodiments, as shown in FIG. 14A, a plurality of touch electrodes may include a plurality of driving units 510 and a plurality of sensing units 520 insulated from each other; each driving unit 510 includes a plurality of driving electrodes 511 arranged in line along the first direction A1, and first connecting parts 512 electrically connecting two adjacent driving electrodes 511; and each sensing unit 520 includes a plurality of sensing electrodes 521 arranged in line along a second direction A2, and a second connecting part 522 electrically connecting two adjacent sensing electrodes 521. The first direction A1 is intersected with the second direction A2. Specifically, the first direction A1 may be the row direction of arrangement of the driving electrodes 511, and the second direction A2 may be the column direction of arrangement of the driving electrodes 511.

Specifically, the touch traces 2 may include driving traces Tx and sensing traces Rx. One driving unit 510 may be correspondingly electrically connected with one driving trace Tx. and one sensing unit 520 may be correspondingly electrically connected with one sensing trace Rx. Specifically, one driving unit 510 may correspond to one touch trace 2, and a plurality of touch traces 2 of a plurality of driving units 510 may be respectively arranged at two sides of the display area AA for wiring. Of course, during specific implementation, the touch traces 2 corresponding to the driving unit 510 and the touch traces 2 corresponding to the sensing unit 520 may also be wired in other manners, which is not limited in the embodiments of the disclosure.

Figure 14B:
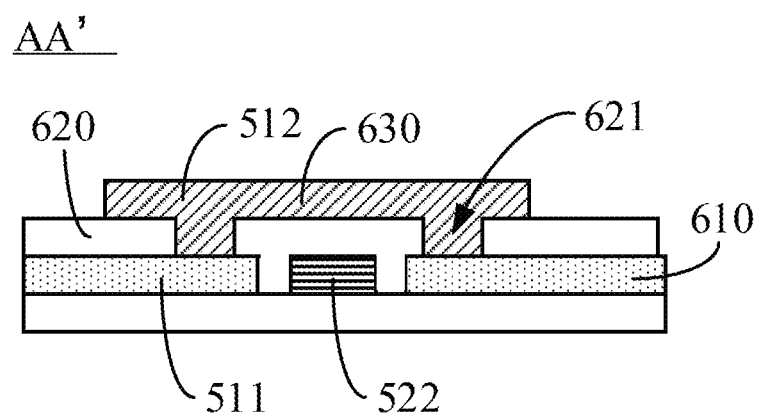
FIG. 14B is a schematic diagram of a cross section along AA' in FIG. 14A.
Figure 14C:
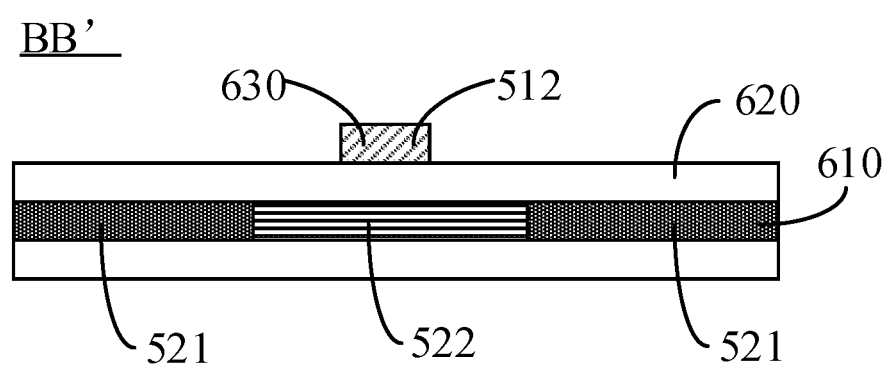
FIG. 14C is a schematic diagram of a cross section along BB' in FIG. 14A.

As shown in FIG. 14B and FIG. 14C, a plurality of touch electrodes include a first metal layer 610, an insulating layer 620 and a second metal layer 630 which are stacked in sequence, and a plurality of via holes 621 in the insulating layer 620. Specifically, in combination with FIG. 3A to FIG. 12, at least part of the touch traces 2 are single-layered traces, and adjacent single-layered touch traces 2 are disposed in different layers. For example, the touch traces 2 include a first layer of touch traces 21 and a second layer of touch traces 22. In some embodiments, the first layer of touch traces 21 is disposed in the first metal layer 610; and the second layer of touch traces 22 is disposed in the second metal layer 630.

Exemplarily, the driving electrode 511, the first connecting part 512 and the sensing electrode 521 are disposed in one of the first metal layer 610 and the second metal layer 630, the second connecting part 522 is disposed in another of the first metal layer 610 and the second metal layer 630, and the second connecting part 522 electrically connects two adjacent sensing electrodes 521 through via holes 621.

Exemplarily, the driving electrode 511, the second connecting part 522 and the sensing electrode 521 are disposed in one of the first metal layer 610 and the second metal layer 630, the first connecting part 512 is disposed in another of the first metal layer 610 and the second metal layer 630, and the first connecting part 512 electrically connects two adjacent driving electrodes 511 through via holes 621.

Exemplarily, the driving electrode 511, the sensing electrode 521, the first connecting part 512 and the second connecting part 522 include metal meshes. Specifically, at least part of the metal meshes may correspond to one or more pixels.

In one possible implementation, in combination with FIG. 9D or FIG. 10A, the touch display panel may also include peripheral traces 7 arranged at a side of the touch trace 2 facing away from the display area AA. Specifically, the peripheral traces 7 may be guard lines (Guard) configured to prevent signal interference between different driving traces Tx, between different sensing traces Rx and/or between driving traces Tx and sensing traces Rx, or, may also be ground lines (GND) configured to guide away electrostatic signals or electromagnetic signals. The peripheral traces 7 may adopt double-layered traces to have smaller resistance. Of course, the peripheral traces 7 may also be other signal lines, which is not limited in the embodiments of the disclosure.

Based on the same inventive concept, an embodiment of the disclosure further provides a display device, including the touch display panel provided in embodiments of the disclosure.

In embodiments of the disclosure, in at least one corner area Y, at least part of the touch traces 2 are single-layered traces, and adjacent single-layered touch traces 2 are disposed in different layers, that is, in at least one corner area Y, at least part of the touch traces 2 are converted from double-layered traces to single-layered traces. Since adjacent single-layered touch traces 2 are disposed in different layers, the spacing between adjacent touch traces 2 in the same layer is relatively large. The probability of contact is low, the risk of poor manufacturing is low, and the center spacing can be compressed by the previous double layers (for example, in combination with FIG. 7A and FIG. 7B, where FIG. 7A is an enlarged view of a dotted circle in FIG. 3A, and FIG. 7B is a comparative schematic diagram when each touch trace 2 is a double-layered trace, and the gap distance between two adjacent touch traces 2 can be reduced under the condition that the line width d of a single touch trace 2 remains unchanged. That is, when the single-layered touch traces 2 and the double-layered touch traces 2 are arranged alternately, the gap distance a1 between double-layered touch traces 2 may be reduced to the distance a2 between adjacent touch traces 2, and a1 is greater than a2, and further the gap distance b1 between two adjacent touch traces 2 when the touch traces 2 are double-layered touch traces 2 can be reduced to a gap distance b2 when the single-layered touch traces 2 and the double-layered touch traces 2 are arranged alternately, b1=a1+d, b2=a1+d, b1 is greater than b2), moreover, since the touch traces 2 are changed to single-layered touch traces, the center spacing e2 of adjacent touch traces 2 in the same layer is actually further increased, thereby reducing as a whole the vertical layout width of a plurality of touch traces 2 in directions perpendicular to their extending directions (reducing from a distance c1 when the touch traces are double-layered touch traces 2 to a distance c2 when single-layered touch traces 2 and double-layered touch traces 2 are arranged alternately, c1>c2), and wiring of a plurality of touch traces 2 may be completed in a small space, thereby greatly reducing the process risk.

Although preferred embodiments of the present invention have been described, additional changes and modifications may be made to these embodiments once basic inventive concepts are known to those skilled in the art. Therefore, the appended claims are intended to be interpreted to encompass preferred embodiments and all the variations and modifications falling within the scope of the present invention.

Evidently those skilled in the art can make various modifications and variations to the embodiments of the present invention without departing from the spirit and scope of the embodiments of the present invention. Thus the present invention is also intended to encompass these modifications and variations thereto so long as the modifications and variations come into the scope of the claims appended to the embodiments of the present invention and their equivalents.

The invention claimed is:

1. A touch display panel, comprising:
    a base substrate, wherein the base substrate comprises a display area, a bezel area surrounding the display area and a bonding area extending from the bezel area on a side;
    a touch structural layer on a side of the base substrate, wherein
      the touch structural layer comprises a plurality of touch traces in the bezel area;
      at least part of the plurality of touch traces are single-layered traces; and
      adjacent single-layered touch traces are disposed in different layers; and
    a dam structure between the base substrate and the touch structural layer;
      wherein the dam structure comprises a first dam structure in the bezel area connected with the bonding area and extending along a first direction; and
      in at least one of the corner areas, the touch traces comprise a first touch trace group at a side of the first dam structure facing away from the bonding area, and a second touch trace group arranged at a side of the first dam structure close to the bonding area.

2. The touch display panel of claim 1, wherein the bezel area comprises a plurality of corner areas; wherein
    the plurality of touch traces extend to the bonding area through at least one of the corner areas;
    in at least one of the corner areas, at least part of the touch traces are single-layered traces, and adjacent single-layered touch traces are disposed in different layers.

3. The touch display panel of claim 1, wherein adjacent single-layered touch traces are disposed in two conducting layers, and the touch traces respectively arranged in two conducting layers are arranged alternately.

4. The touch display panel of claim 1, wherein in at least one of the corner areas, all the touch traces are distributed at a side of the first dam structure facing away from the bonding area.

5. The touch display panel of claim 1, wherein in the first touch trace group, the touch traces are single-layered traces, and adjacent single-layered touch traces are disposed in different layers.

6. The touch display panel of claim 1, wherein in the second touch trace group, at least part of the touch traces are single-layered traces, and adjacent single-layered touch traces are disposed in different layers.

7. The touch display panel of claim 1, wherein in the first touch trace group and the second touch trace group, the touch traces are single-layered traces, and adjacent single-layered touch traces are disposed in different layers.

8. The touch display panel of claim 5, wherein the touch traces comprise bridge trace parts correspondingly electrically connected to the respective touch traces in the second touch trace group;
   an orthographic projection of the bridge trace part on the base substrate has an overlapping area with an orthographic projection of the first dam structure on the base substrate; and
   an extending direction of the orthographic projection of the bridge trace part on the base substrate is intersected with the first direction;
   wherein at least part of the bridge trace parts are single-layered traces, and adjacent single-layered bridge trace parts are disposed in different layers.

9. The touch display panel of claim 8, wherein the first touch trace group and the second touch trace group both comprise a plurality of first trace parts extending along the first direction; and
   a center spacing between the adjacent bridge trace parts in an arrangement direction is greater than a center spacing between adjacent first trace parts in an arrangement direction.

10. The touch display panel of claim 1, wherein the bezel area comprises:
    a first bezel area extending along a first direction and connected with the bonding area; and
    a second bezel area;
    wherein the first dam structure is located in the first bezel area connected with the bonding area;
    the touch traces comprises second trace parts in the second bezel area, and at least part of the second trace parts are double-layered traces.

11. The touch display panel of claim 10, wherein a center spacing between adjacent second trace parts in an arrangement direction is greater than a center spacing between an adjacent first trace parts in the arrangement direction.

12. The touch display panel of claim 11, wherein a line width of the second trace part is substantially same as a line width of the first trace part.

13. The touch display panel of claim 12, wherein a gap distance of the adjacent second trace parts is greater than a gap distance of the adjacent first trace parts.

14. The touch display panel of claim 1, wherein line widths of all the first trace parts are same.

15. The touch display panel of claim 14, wherein a center spacing between the adjacent first trace parts of a same layer in the arrangement direction is twice a center spacing between the adjacent first trace parts of different layers in the arrangement direction.

16. The touch display panel of claim 1, wherein the touch display panel further comprises a plurality of touch electrodes in the display area, and the touch electrodes are correspondingly electrically connected with the touch traces;
    the plurality of touch electrodes may comprise a plurality of driving units and a plurality of sensing units insulated from each other;
    the driving unit comprises:
       a plurality of driving electrodes arranged in line along the first direction; and
       first connecting parts electrically connecting two adjacent driving electrodes;
    the sensing unit comprises:
       a plurality of sensing electrodes arranged in line along a direction vertical to the first direction; and
       a second connecting part electrically connecting two adjacent sensing electrodes.

17. The touch display panel of claim 16, wherein the touch display panel comprises a first metal layer, an insulating layer and a second metal layer which are stacked in sequence;
    wherein a plurality of via holes are provided in the insulating layer; and
    among two conducting layers in which the touch traces are disposed, one layer of the touch traces is disposed in the first metal layer, and other layer of the touch traces is disposed in the second metal layer.

18. A display device, comprising the touch display panel of claim 1.

* * * * *